(12) United States Patent
Olteanu et al.

(10) Patent No.: US 11,057,263 B2
(45) Date of Patent: Jul. 6, 2021

(54) METHODS AND SUBSYSTEMS THAT EFFICIENTLY DISTRIBUTE VM IMAGES IN DISTRIBUTED COMPUTING SYSTEMS

(71) Applicant: VMware, Inc., Palo Alto, CA (US)

(72) Inventors: Mihnea Olteanu, Palo Alto, CA (US); Bharath Siravara, Bellevue, WA (US); Marius Popa, Kirkland, WA (US); Xin Yao, Palo Alto, CA (US); Vui Chiap Lam, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 749 days.

(21) Appl. No.: 15/277,902

(22) Filed: Sep. 27, 2016

(65) Prior Publication Data
US 2018/0091590 A1 Mar. 29, 2018

(51) Int. Cl.
*H04L 12/24* (2006.01)
*H04L 29/06* (2006.01)
*G06F 9/50* (2006.01)

(52) U.S. Cl.
CPC .......... *H04L 41/044* (2013.01); *G06F 9/5077* (2013.01); *H04L 41/042* (2013.01); *H04L 67/38* (2013.01)

(58) Field of Classification Search
CPC .............. H04L 41/044; H04L 67/1095; H04L 67/1097; H04L 67/10; H04L 67/1008; H04L 67/1029; H04L 67/38; G06F 9/45558; G06F 9/5077; G06F 2009/45562; G06F 2009/4557; G06F 9/5005; G06F 9/5027; G06F 2009/45575; G06F 3/0611; G06F 3/0619; G06F 3/065; G06F 3/067; G06F 9/45533
See application file for complete search history.

(56) References Cited

U.S. PATENT DOCUMENTS

| | | | |
|---|---|---|---|
| 9,055,067 B1* | 6/2015 | Ward, Jr. | H04L 67/10 |
| 9,904,481 B2* | 2/2018 | Joshi | G06F 3/0619 |
| 2007/0185973 A1* | 8/2007 | Wayda | G06F 3/0607 |
| | | | 709/217 |
| 2010/0161549 A1* | 6/2010 | Plancarte | G06F 9/4843 |
| | | | 707/608 |
| 2013/0339470 A1* | 12/2013 | Jeswani | H04L 67/1097 |
| | | | 709/213 |
| 2014/0196038 A1* | 7/2014 | Kottomtharayil | G06F 9/505 |
| | | | 718/1 |
| 2014/0201735 A1* | 7/2014 | Kannan | G06F 9/45558 |
| | | | 718/1 |
| 2015/0058467 A1* | 2/2015 | Douglas | G06Q 10/0631 |
| | | | 709/223 |

(Continued)

*Primary Examiner* — Greg C Bengzon

(57) ABSTRACT

The current document is directed to methods and systems that efficiently distribute virtual-machine images ("VM images") among servers within large, distributed-computer-system-implemented IAAS platforms to facilitate temporally and computationally efficient instantiation of virtual machines within the servers. In implementations discussed below, VM images are stored in a distributed fashion throughout one or more distributed computing systems, using several different VM-image-distribution models, in order to balance computational-resource usage, temporal constraints, and other factors and considerations related to VM-image distribution and VM instantiation.

20 Claims, 37 Drawing Sheets

(56) References Cited

U.S. PATENT DOCUMENTS

| | | | | |
|---|---|---|---|---|
| 2015/0331635 A1* | 11/2015 | Ben-Shaul | ............ | G06F 9/5061 |
| | | | | 711/120 |
| 2016/0063029 A1* | 3/2016 | Mu | .................... | H04L 67/1097 |
| | | | | 707/620 |
| 2016/0085575 A1* | 3/2016 | Dornemann | ........ | G06F 11/1471 |
| | | | | 718/1 |
| 2016/0316003 A1* | 10/2016 | Snider | ................. | H04L 67/1002 |
| 2016/0366217 A1* | 12/2016 | Eda | .................... | H04L 67/1095 |
| 2016/0371153 A1* | 12/2016 | Dornemann | ........ | G06F 11/1458 |
| 2017/0366606 A1* | 12/2017 | Ben-Shaul | .......... | H04L 67/1008 |
| 2018/0024853 A1* | 1/2018 | Warfield | ............ | G06F 9/45558 |

* cited by examiner

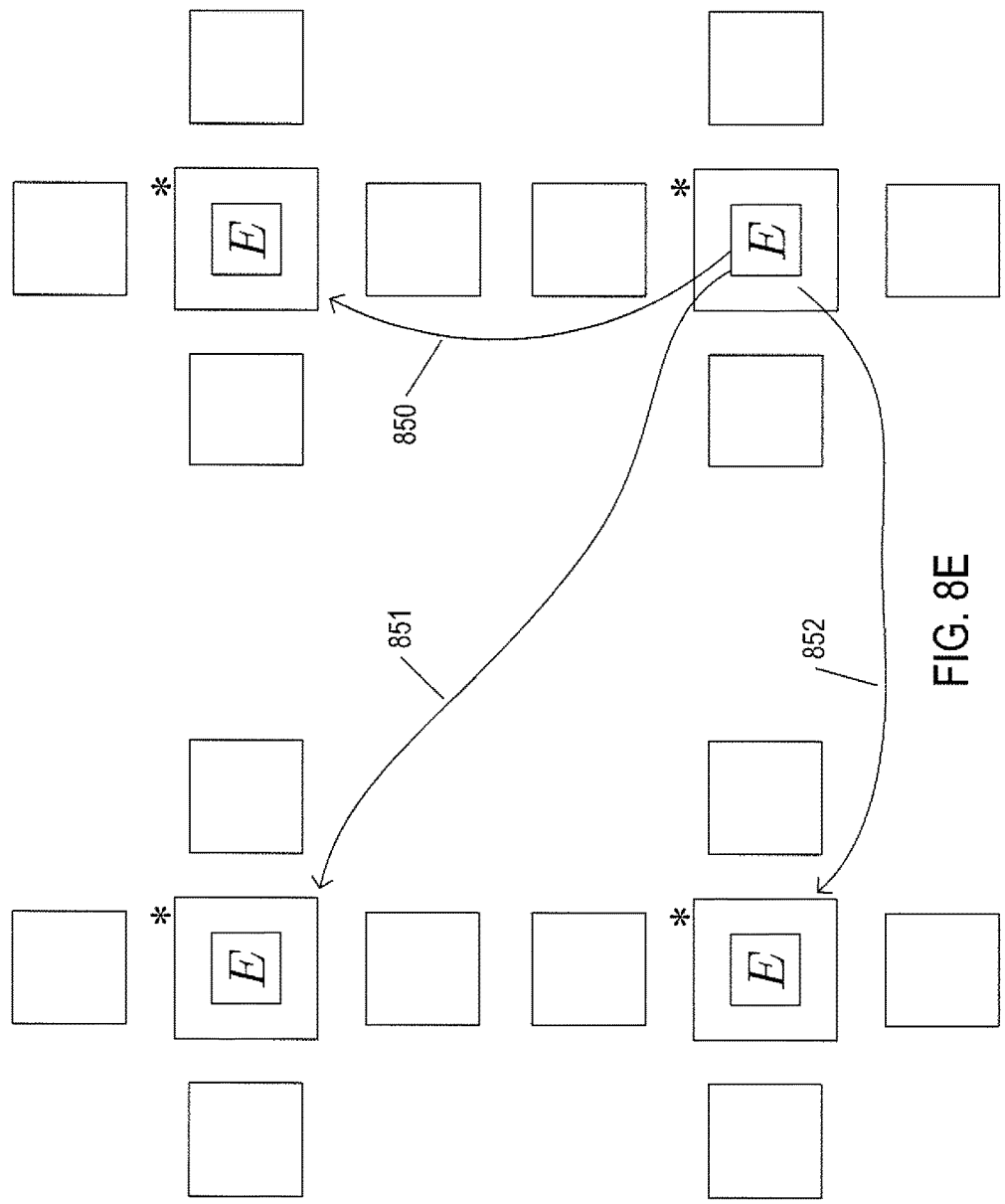

METHODS AND SUBSYSTEMS THAT EFFICIENTLY DISTRIBUTE VM IMAGES IN DISTRIBUTED COMPUTING SYSTEMS

TECHNICAL FIELD

The current document is directed to management of infrastructure-as-a-service platforms, including infrastructure-as-a-service platforms implemented in one or more large distributed computing systems and, in particular, to methods and subsystems within management systems for infrastructure-as-a-service platforms that efficiently distribute VM images to servers for instantiating VMs within servers.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system management and administration. Currently, these needs have begun to be addressed by highly capable automated and semi-automated management and administration tools and facilities. As with many other types of computational systems and facilities, from operating systems to applications, many different types of automated and semi-automated administration and management facilities have emerged, providing many different products with overlapping functionalities, but each also providing unique functionalities and capabilities.

Recently, the advent of cloud computing and large distributed computing systems has made provision of computational bandwidth through infrastructure-as-a-service ("IAAS") distributed computing systems an attractive business model, similar to provision of electric and water utilities to public-utility consumers. As the size of these systems increases, and as consumers of computational resources provided by IAAS platforms increasingly rely on these computational resources for implementing businesses that were previously implemented within their own private data centers, designers, developers, and users of IAAS services are increasingly aware of the need to optimize provision of computational services and resources through IAAS platforms to provide the cost efficiency, temporal efficiencies, and flexibilities needed by consumers of IAAS computational bandwidth and resources in increasingly large IAAS-platform-implemented business-support infrastructures.

SUMMARY

The current document is directed to methods and systems that efficiently distribute virtual-machine ("VM") images among servers within large, distributed-computer-system-implemented IAAS platforms to facilitate temporally and computationally efficient instantiation of virtual machines within the servers. In implementations discussed below, VM images are stored in a distributed fashion throughout one or more distributed computing systems, using several different VM-image-distribution models, in order to balance computational-resource usage, temporal constraints, and other factors and considerations related to VM-image distribution and VM instantiation.

BRIEF DESCRIPTION OF THE DRAWINGS

FIGS. 8D-G illustrate a first type of VM image, referred to as an EAGER image.

DETAILED DESCRIPTION

The current document is directed to methods and systems that efficiently distribute virtual-machine images ("VM images") among servers within large, distributed-computer-system IAAS platforms to facilitate temporally and computationally efficient instantiation of virtual machines within the servers. In a first subsection below, an overview of computer systems and computer architecture is provided, with reference to FIGS. 1-6. In a second subsection, the currently disclosed methods and systems are described in detail with reference to FIGS. 7A-10M.

Overview of Computer Systems and Computer Architecture

Figure 1:
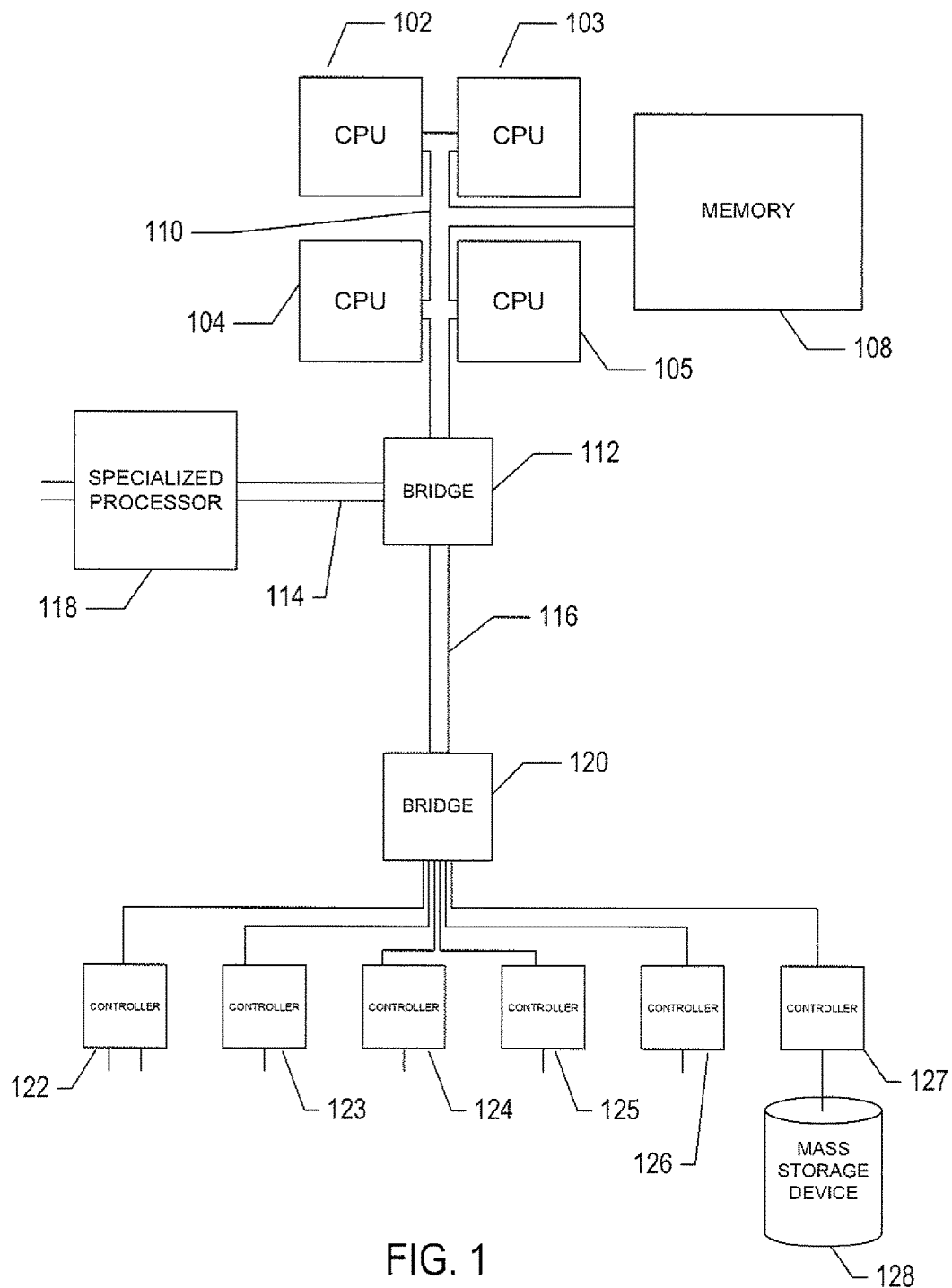
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
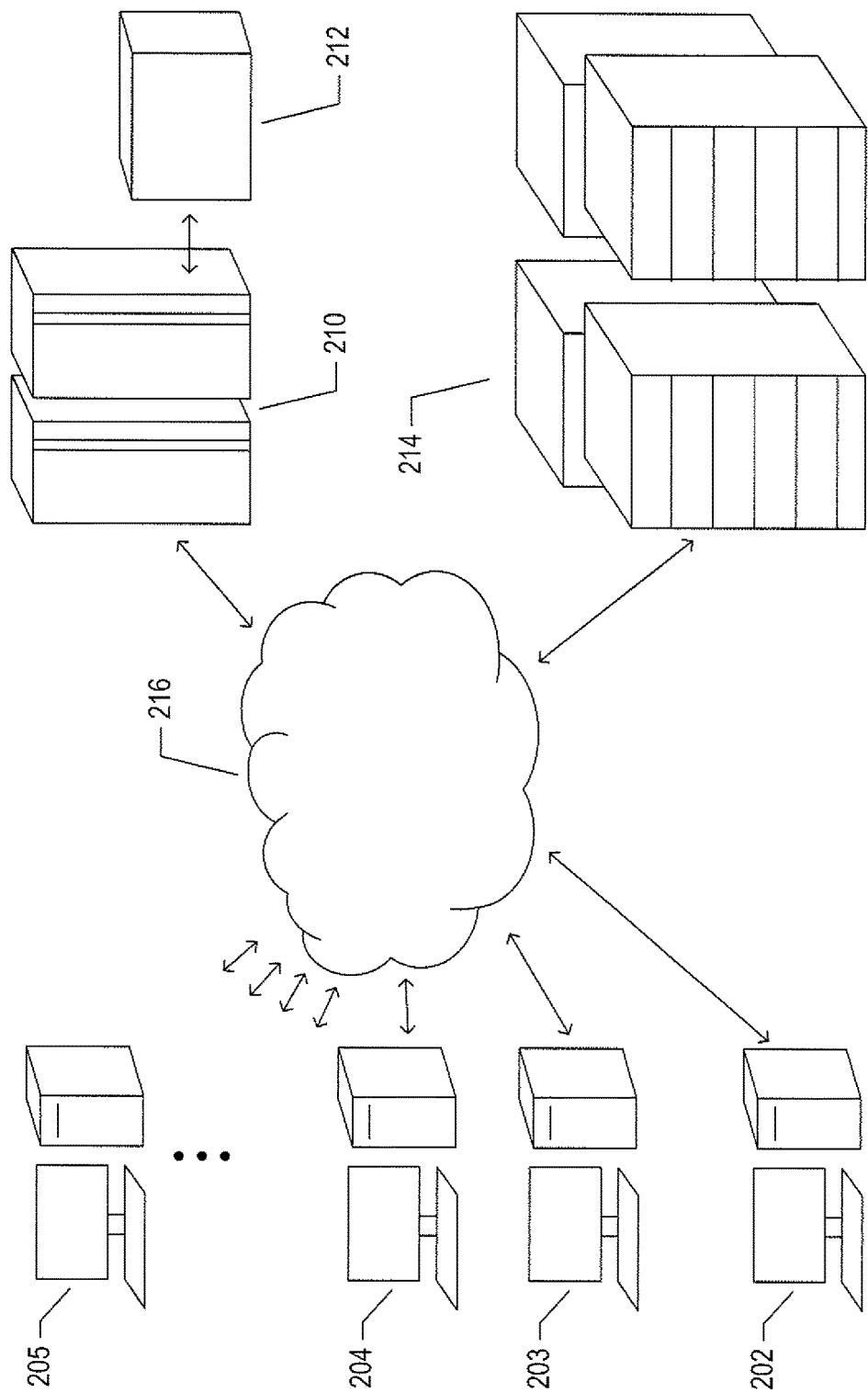
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
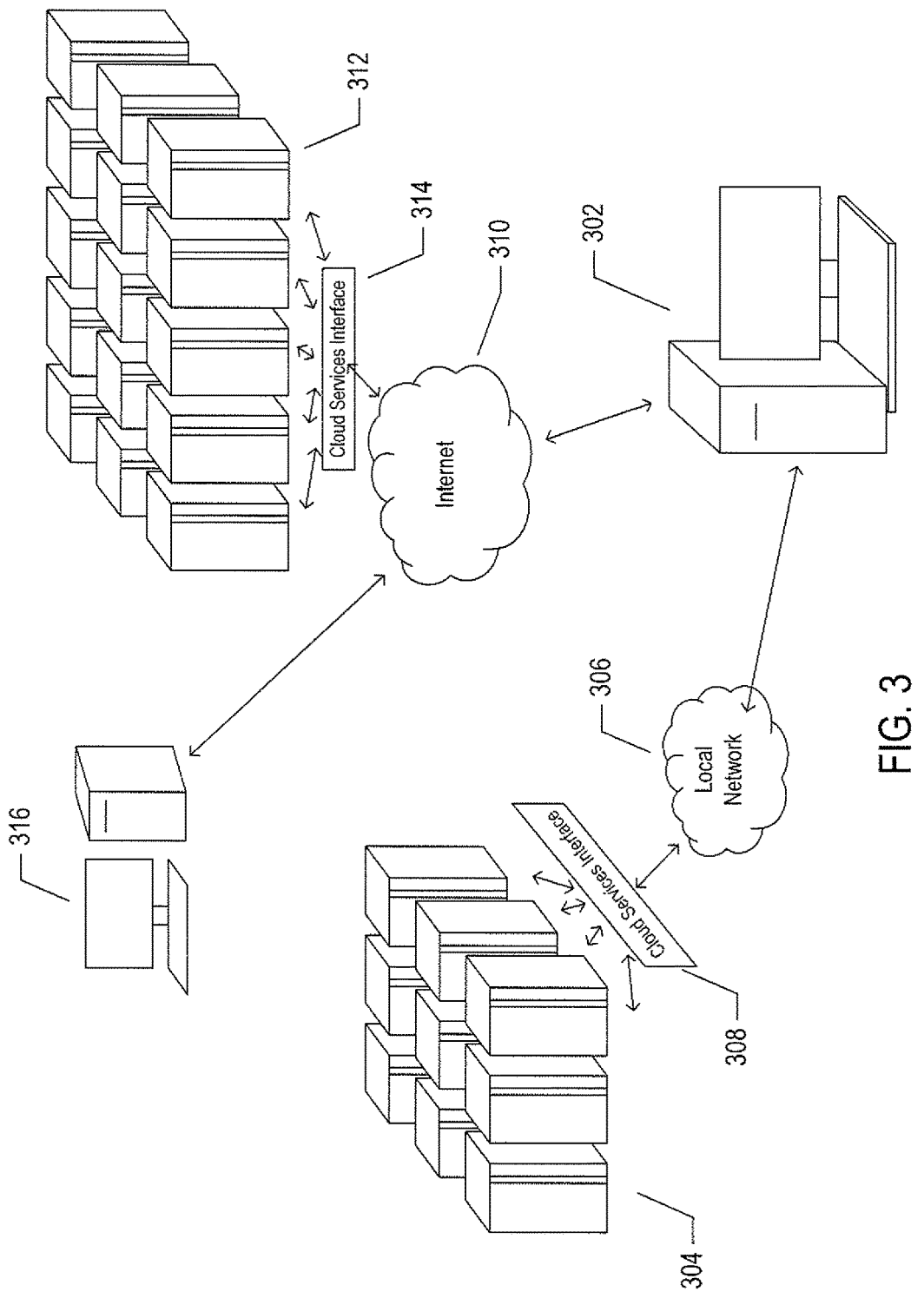
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Figure 4:
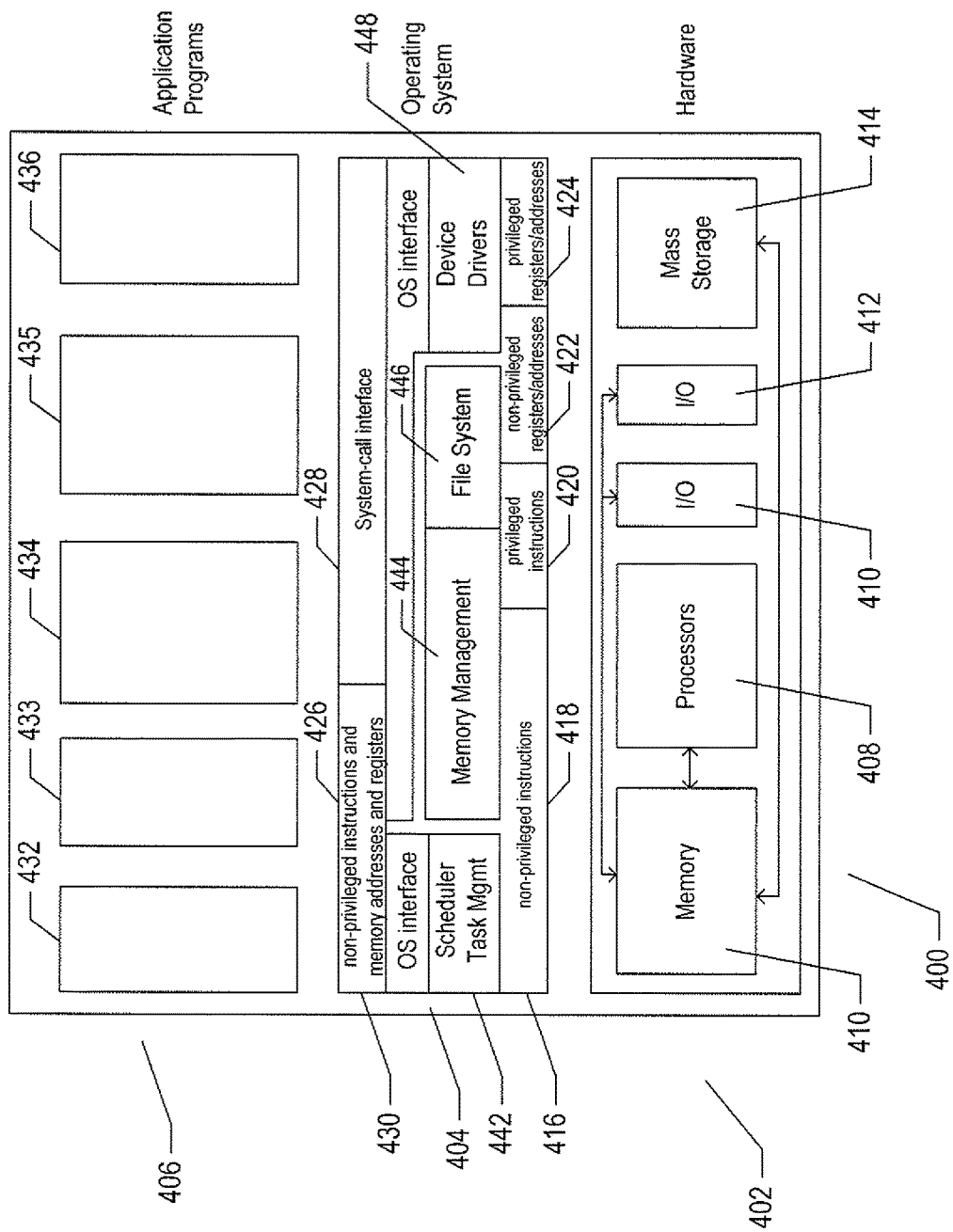
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
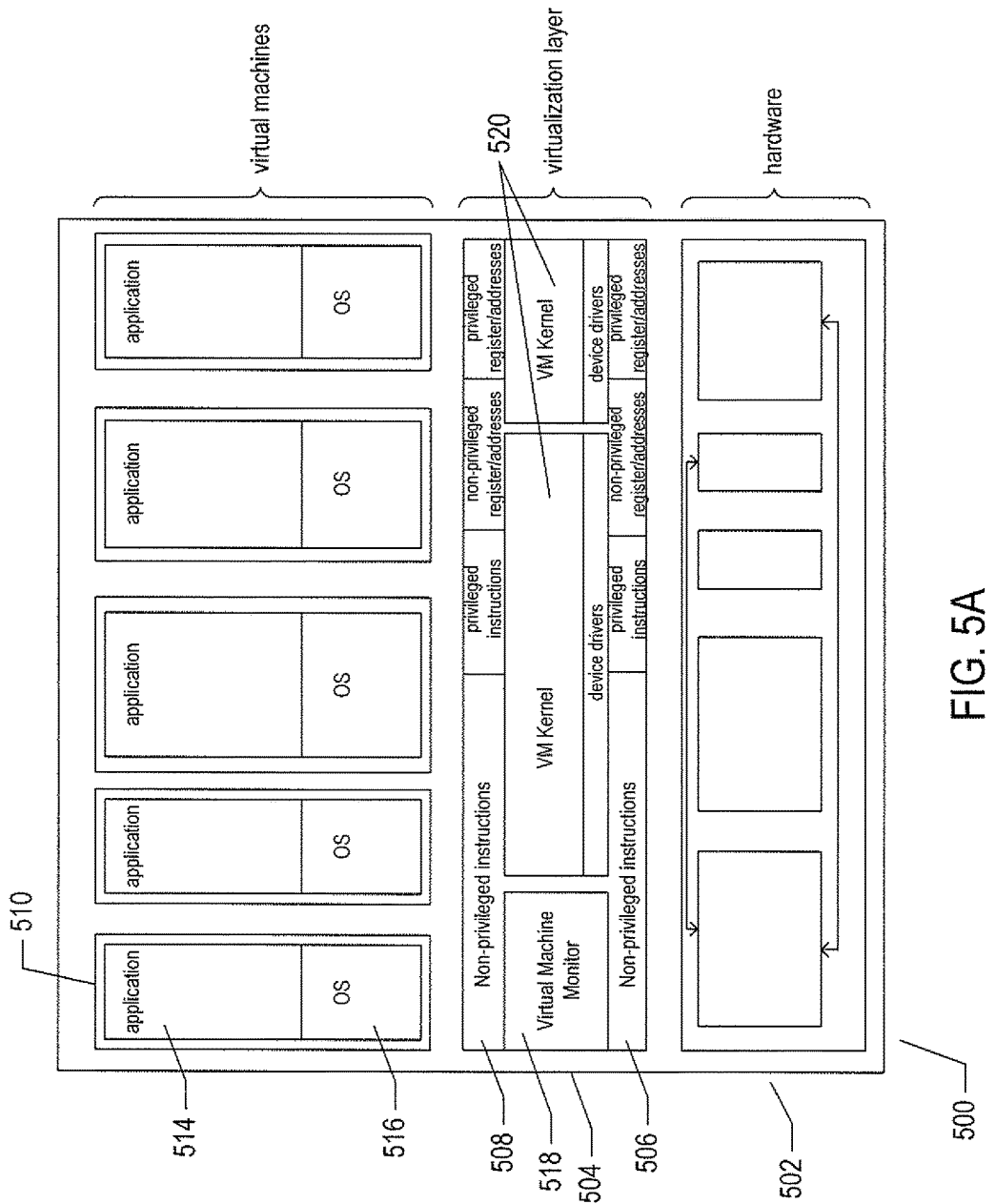
FIGS. 5A-D illustrate several types of virtual machine and virtual-machine execution environments.
Figure 5B:
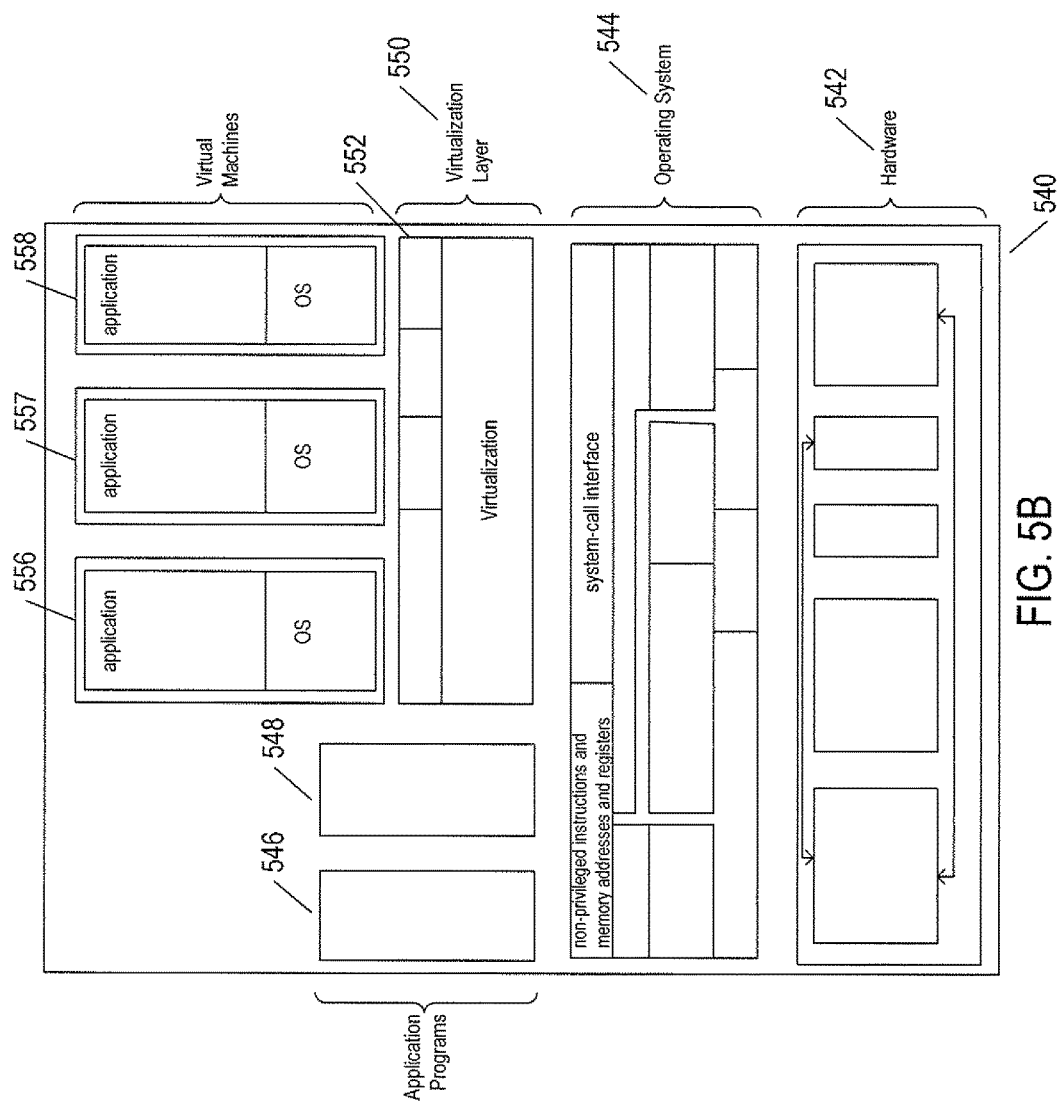

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, similar to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

Figure 5C:
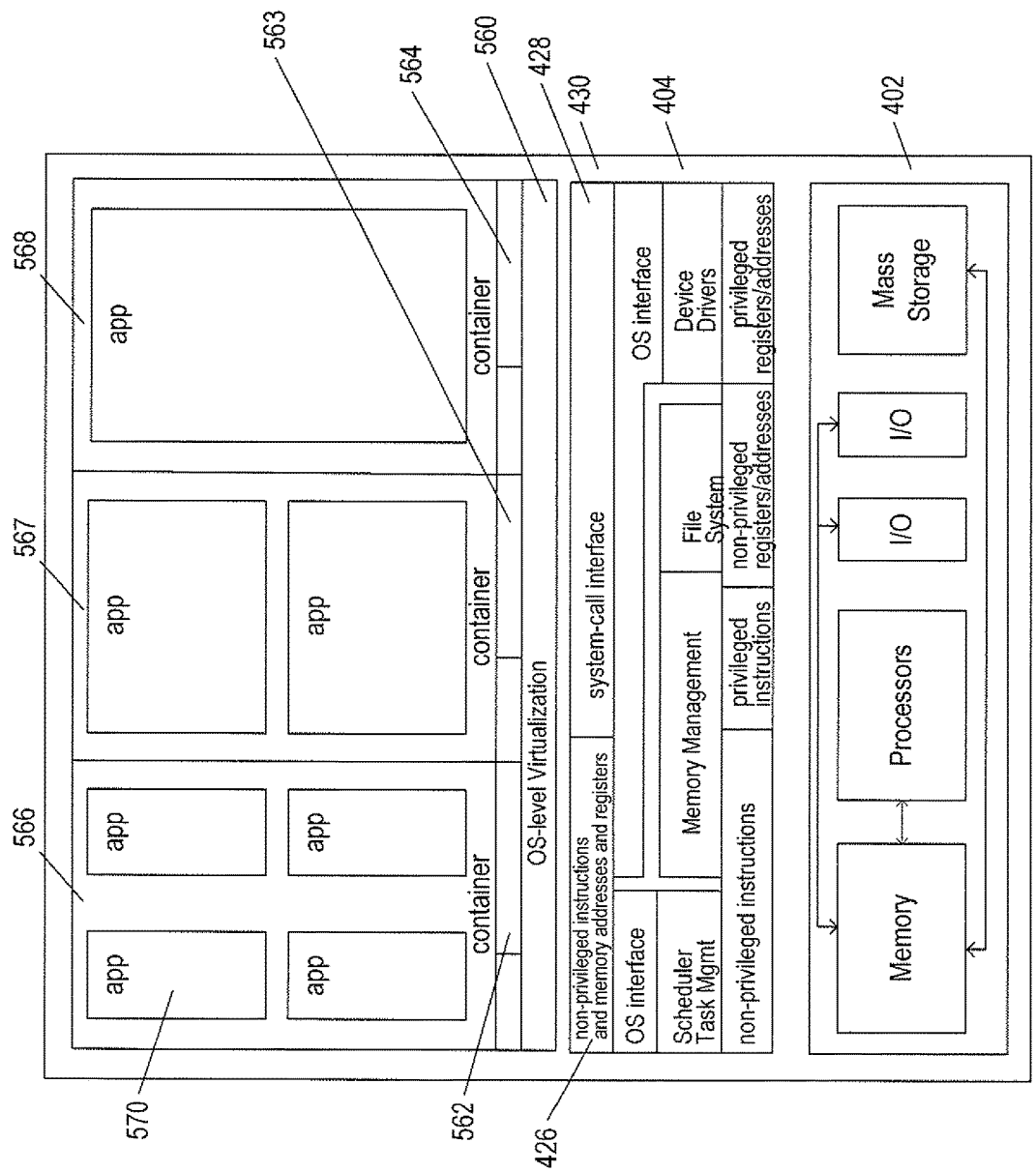

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
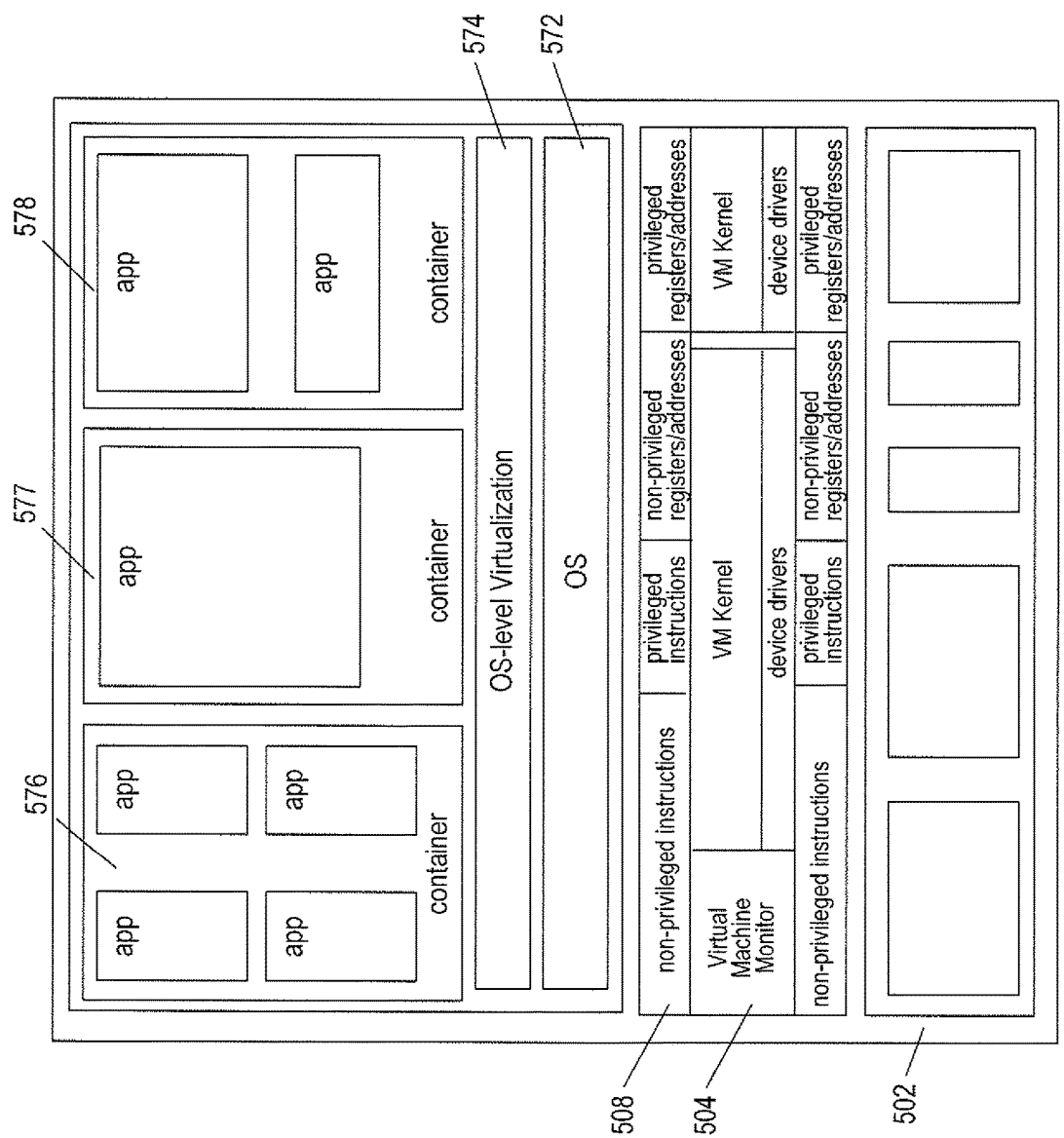

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

In FIGS. 5A-D, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
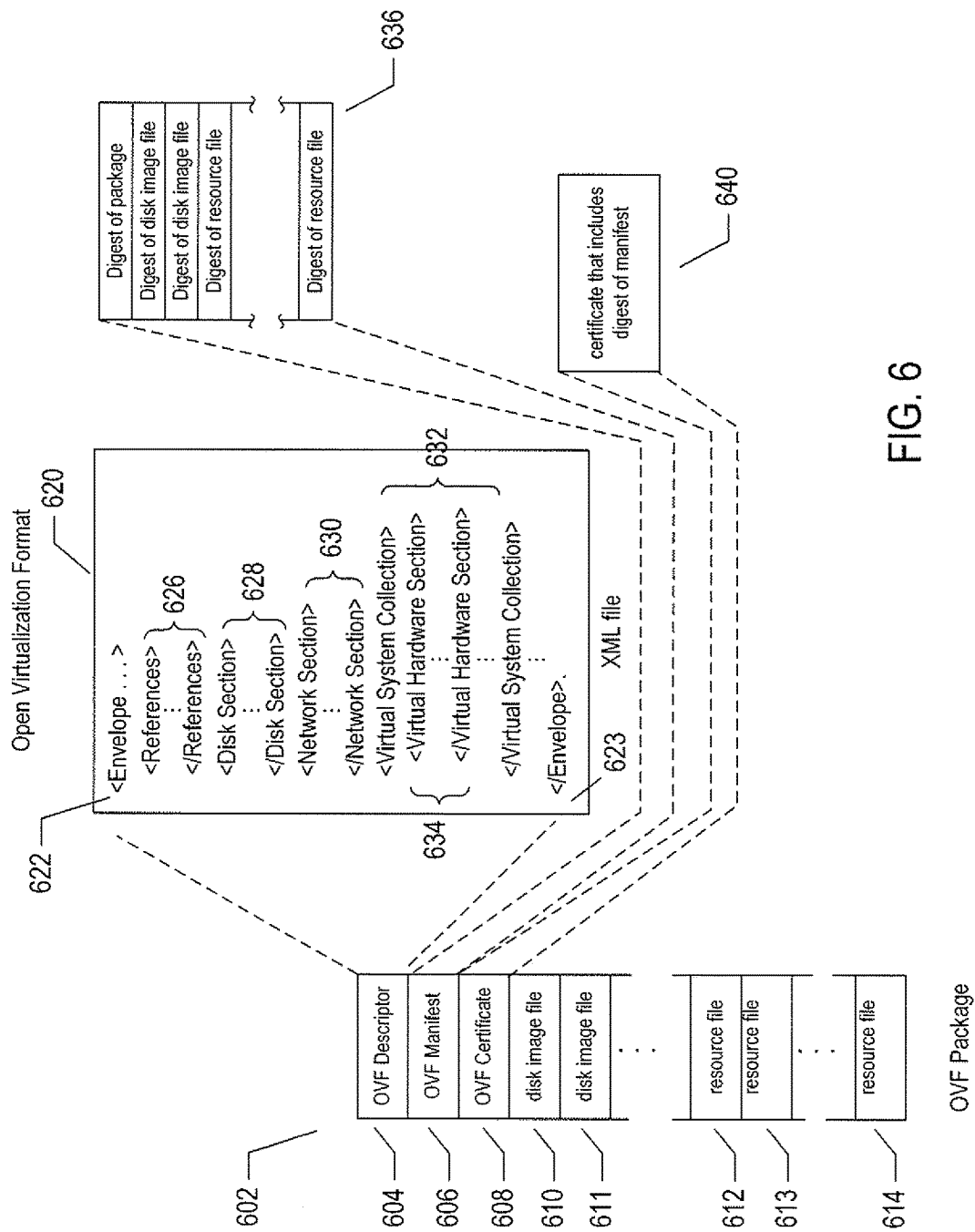
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Methods and Systems to Which the Current Document is Directed

Figure 7A:
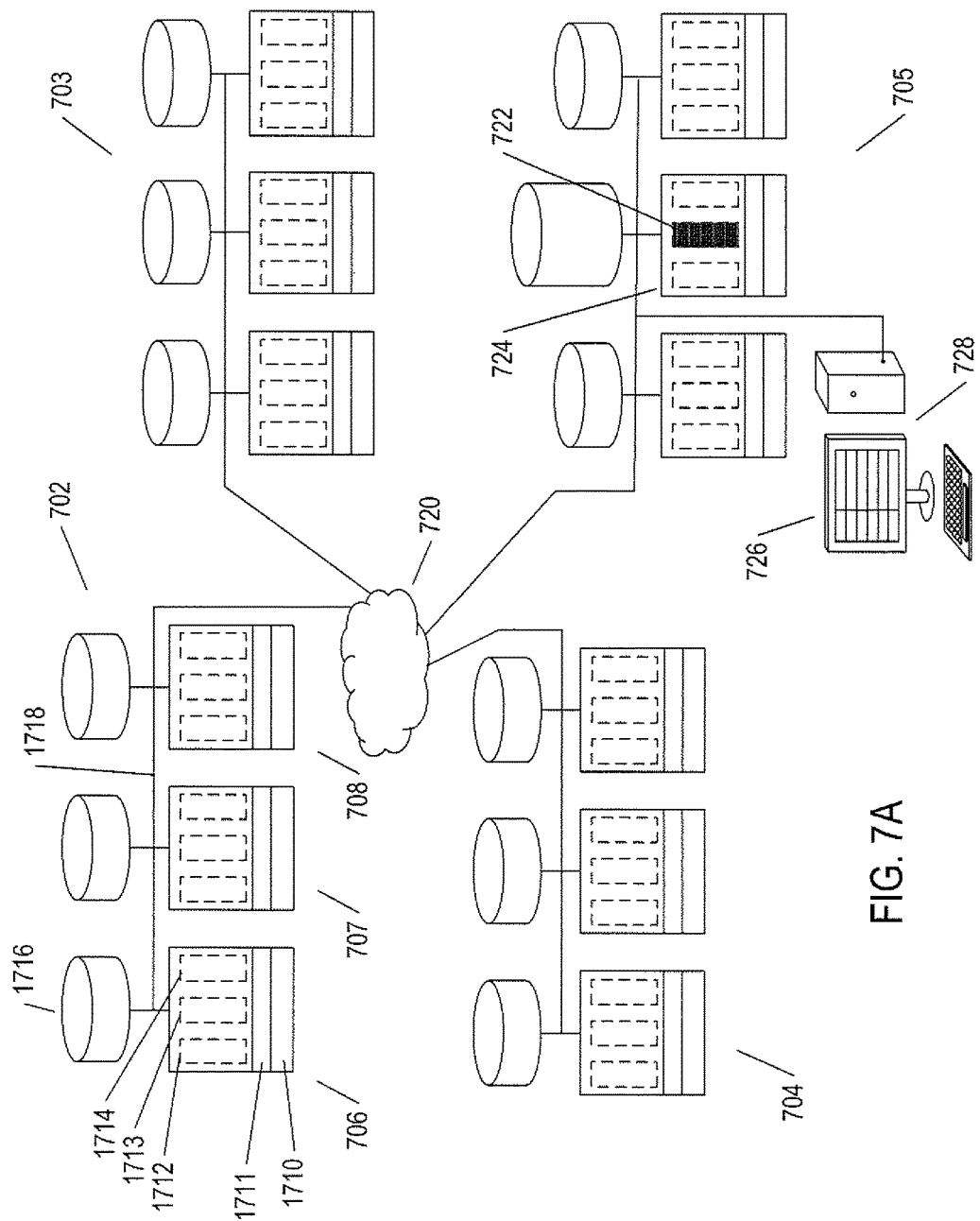
FIGS. 7A-D illustrate VM-image creation and distribution in a conventional distributed-computer-system implementation of an IAAS platform.
Figure 7B:
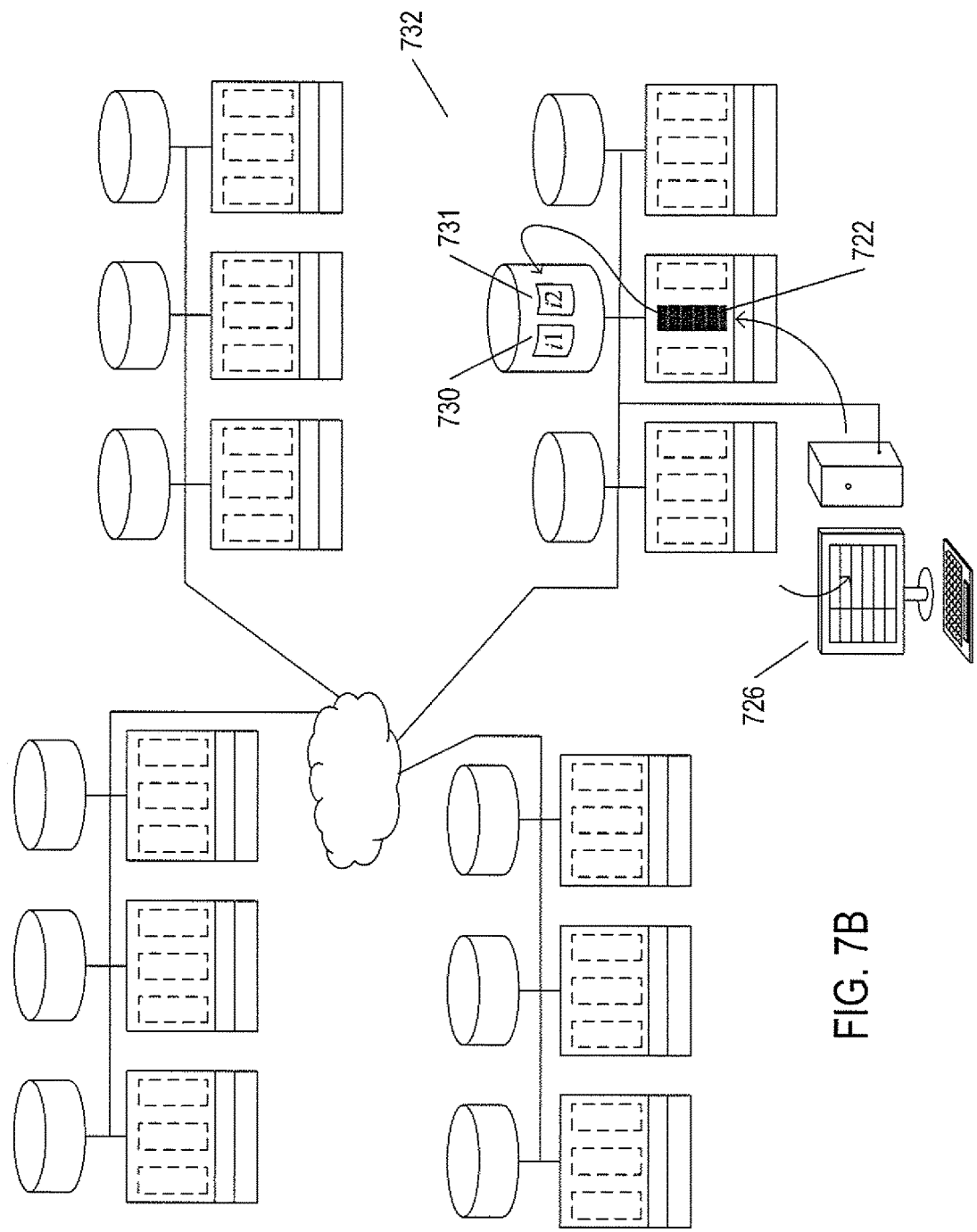
Figure 7C:
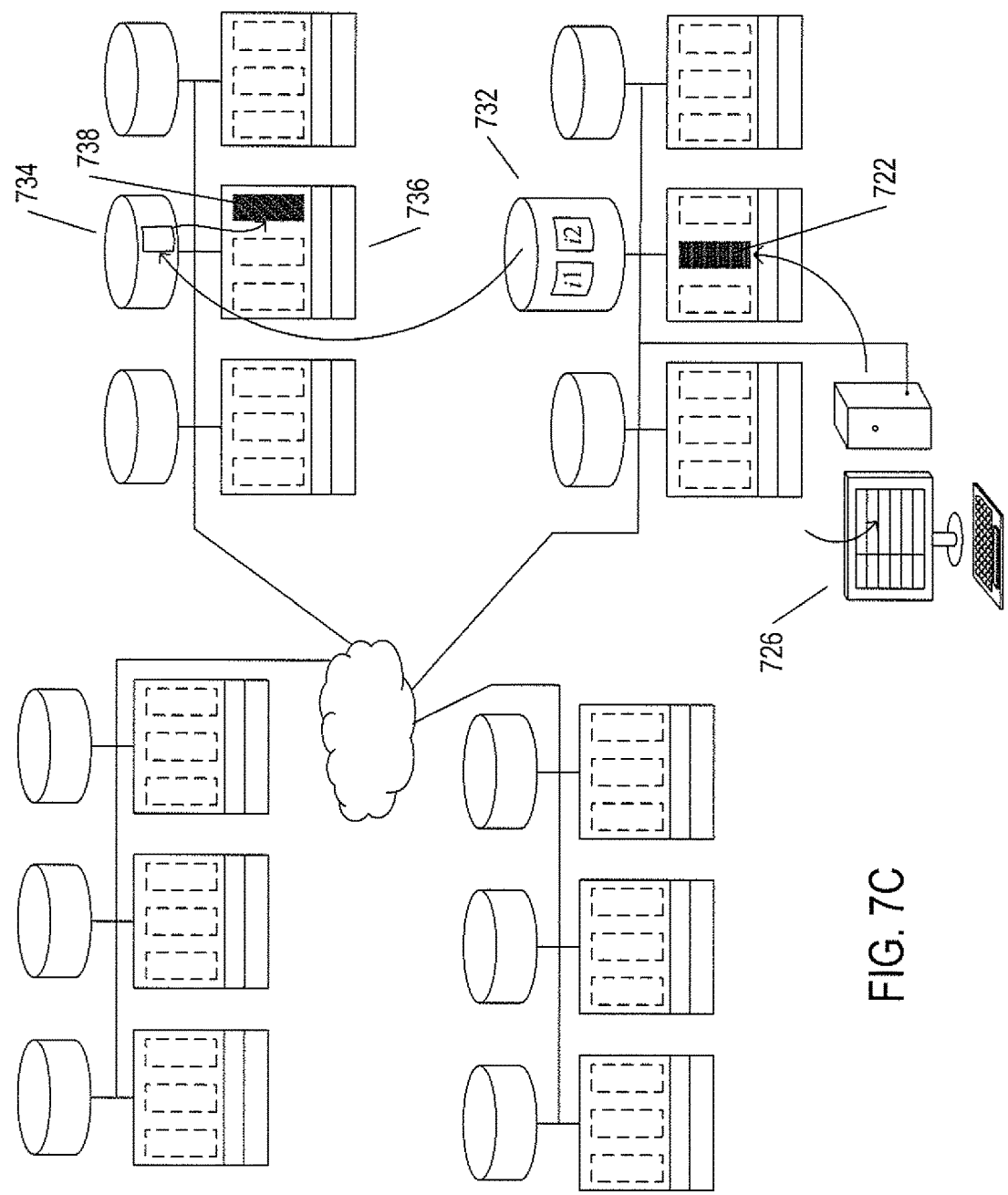

FIGS. 7A-D illustrate VM-image creation and distribution in a conventional distributed-computer-system implementation of an IAAS platform. FIGS. 7A-C all use common illustration conventions that are again employed in FIGS. 8A-C, discussed below.

FIG. 7A shows a distributed-computer-system implementation of an IAAS platform at a high level of abstraction. The distributed computing system includes four different groups of servers 702-705, each represented, in FIG. 7A, by three servers, such as the three servers 706-708 within server group 702. Each server includes a virtualization layer 710, OS layer 711, and supports execution one or more virtual machines in each of a number of different containers, the containers available for VM execution indicated by three dashed-line rectangles 712-714. Of course, traditional virtualization-layer support for VM execution, as described above with reference to FIG. 5B, can alternatively provide VM-execution environments. Each server is also shown connected to, or including, a mass-storage device 716. The servers in each group are connected by local area networks, such as local area network 718, and all of the local area networks are interconnected via a wide-area network 720. Each server group may be located at a geographically distinct location and may include hundreds, thousands, or more servers, many internal networks, a large number of separate data-storage devices and appliances, specialized computer systems, virtualized networks, storage devices, and servers provided in virtualized data centers above the physical hardware, and many other components. However, for purposes of discussing the currently disclosed VM-distribution methods and subsystems, the level of abstraction at which the IAAS platform is illustrated in FIG. 7A is sufficient for a clear and complete discussion.

The IAAS platform shown in FIG. 7A is controlled by a management system implemented as one or more executing VMs 722 within a management server 724. The management subsystem provides a user interface 726 for IAAS-platform administrators via one or more work stations, PCs, or even mobile processor-controlled devices 728.

FIGS. 7B-C illustrate two different basic operations related to VM images. A VM image is a data file, such as the OVF package discussed above with reference to FIG. 6, that encapsulates all of the information that is needed to be exported to a server in order for the server to instantiate a corresponding VM within an execution environment, such as a container or hypervisor-provided VM-execution environment. As shown in FIG. 7B, a user may direct, through the user interface 726, one or more commands or directives to the IAAS management subsystem 722 to create and store one or more VM images 730-731. In conventional IAAS-platform management subsystems, these VM images are centrally stored in a centralized VM-image database within one or a collection of data-storage devices or systems 732. FIG. 7C illustrates a second type of operation carried out by IAAS-platform management subsystems with regard to VM images. As shown in FIG. 7C, a user may direct, through the user interface 726, a command or directive to the IAAS-platform management subsystem 722 to transfer, or propagate, a particular VM image from the VM-image data store 732 to a local data-storage device or appliance 734 associated with a server computer 736 so that the VM image can be instantiated as an executing VM 738 within an execution environment provided by the server 736. The VM-image-transfer and VM-instantiation operations represent the types of operations that allow computational resources to be configured on behalf of IAAS-platform customers.

Again, it should be noted that local data-storage devices and appliances may be incorporated within server computers, attached to server computers, or accessible to one or more server computers through physical or virtual internal networks. In general, local data-storage devices and appliances serve a smaller number of servers than the total number of servers within a distributed computer system and generally provide faster access times than remote data-storage devices.

Transfer of VM images to servers within IAAS platforms is generally highly dynamic. Customers may wish to instantiate VMs rapidly in order to meet demand for VM-provided services of their customers, to rapidly shift VMs among servers and among geographical locations within a geographically dispersed distributed computing system, and to rapidly terminate execution of unloaded or lightly loaded executing VMs from servers to optimize financial outlay to the IAAS platform. VM images may be quite large, from hundreds of megabytes to tens or more gigabytes of data in each VM image. Thus, continuous or rapid intermittent transmission of VM images throughout a distributed computing system on behalf of customers may consume a significant portion of the total network bandwidth within the distributed computing system, slowing network communications needed by executing VMs for task execution and thus deleteriously impacting computational bandwidth. Because consumers of computational resources provided by an IAAS platform may need to rapidly deploy VMs in response to demand from their customers, the amount of time needed to transfer VM images to servers and instantiate executing VMs from those VM images may be a significant performance requirement for an IAAS platform. In addition, regardless of the VM-image-transfer and VM-instantiation times, it may be important to IAAS-platform customers that these times be consistent and predictable, to facilitate business-platform implementation within the distributed computer system. Finally, because VM images are so large, the storage of VM images in a distributed computing system may consume a significant portion of the total data-storage capacities of data-storage devices and subsystems within the distributed computing system. IAAS-platform customers may desire to create and store large numbers of VM images to prepare for rapid instantiation of a diverse set of VMs, but this desire may conflict with needs for data-storage capacity of other IAAS-platform customers and of executing VMs for task-related data storage.

Figure 7D:
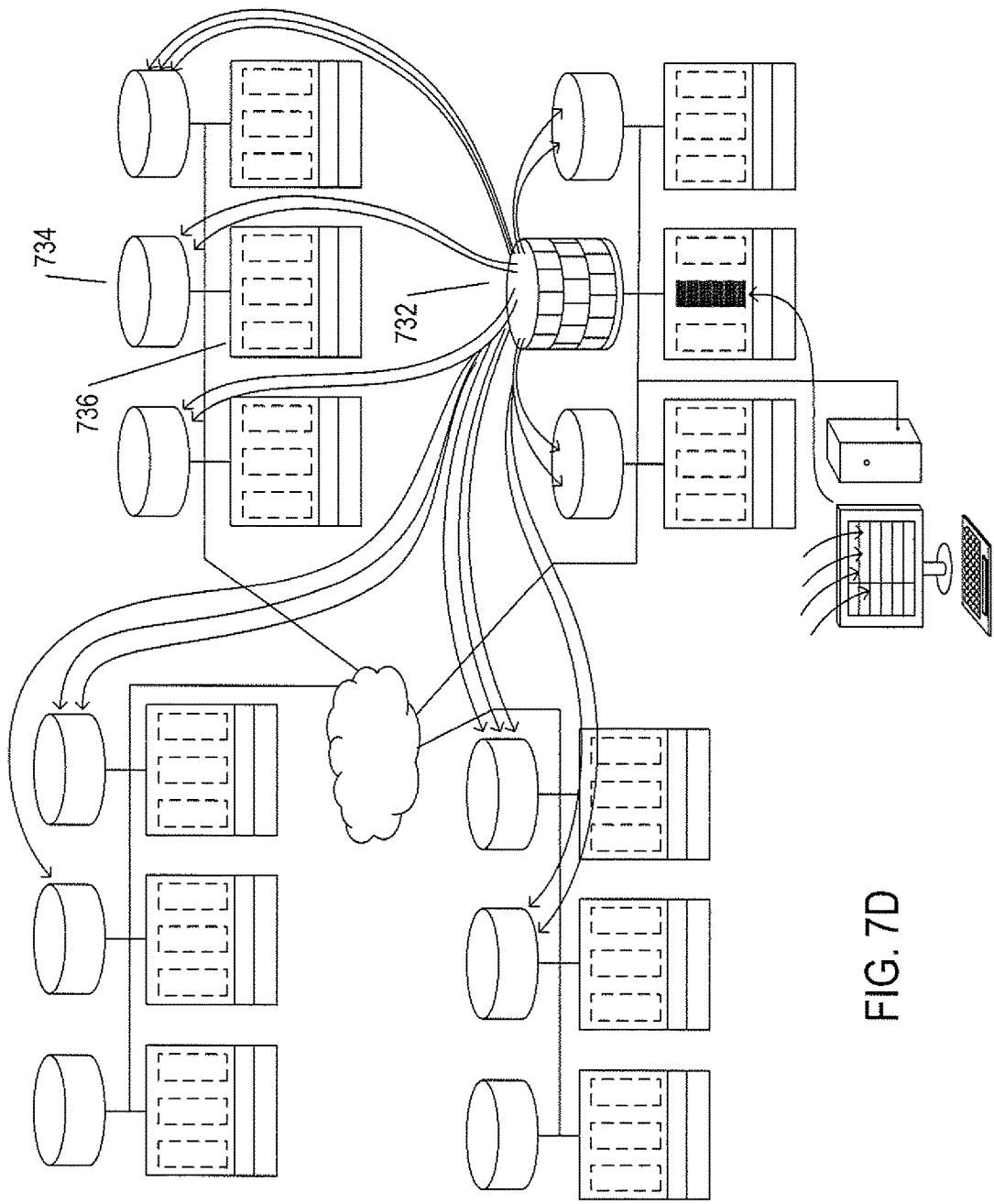

FIG. 7D illustrates certain of the problems associated with centralized VM-image storage within a distributed-computing-system implementation of an IAAS platform. Because of the large and dynamic demand for transfer of VM images to servers, the centralized VM-image data store 732 may become both a significant performance bottleneck as well as a significant risk for catastrophic failure within the IAAS platform. VMs that are instantiated, execute for a short time, and then are either terminated or moved to different servers are associated with large numbers VM-image transfers from the central data store 732 to remote data-storage devices, such as data-storage device 734 associated with server 736. These frequent VM-image transfers may severely impact network capacities within the distributed computing system. Furthermore, because of impacts both to data-storage-device capacities and network capacities, as well as the inefficiencies commonly associated with single-point repositories of frequently needed information, the temporal latencies associated with instantiating a VM on a server within the distributed computing system may be greater, in general, than the latencies desired by customers of an IAAS platform and may vary widely depending on distributed-computer-system loads and operational characteristics. Furthermore, centralized storage of VM images may introduce substantial constraints on the total VM-image storage capacity of a distributed computer system.

Figure 8A:
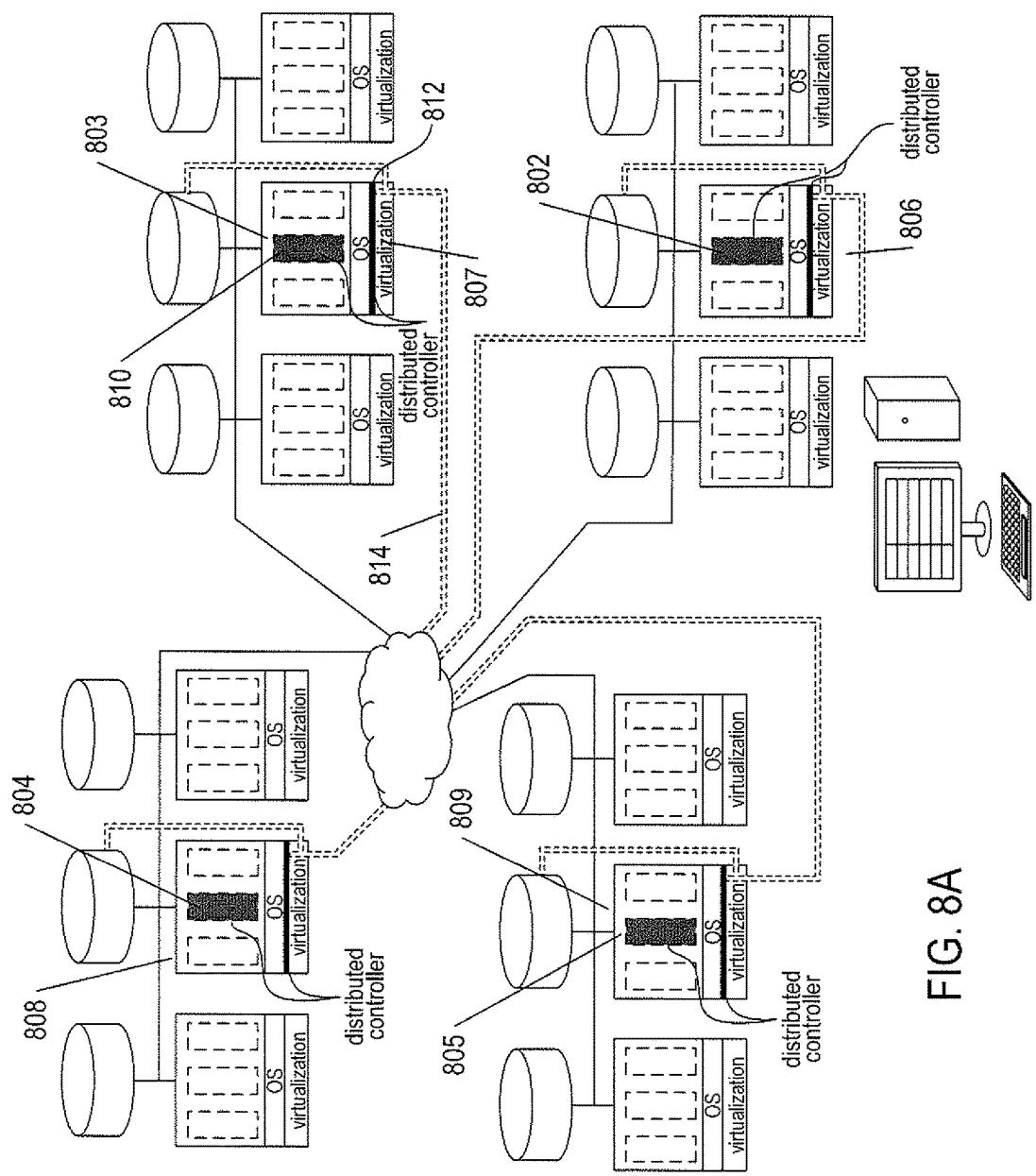
FIGS. 8A-C illustrate features and characteristics of the efficient VM-distribution subsystem within a distributed computing system to which the current document is directed.
Figure 8B:
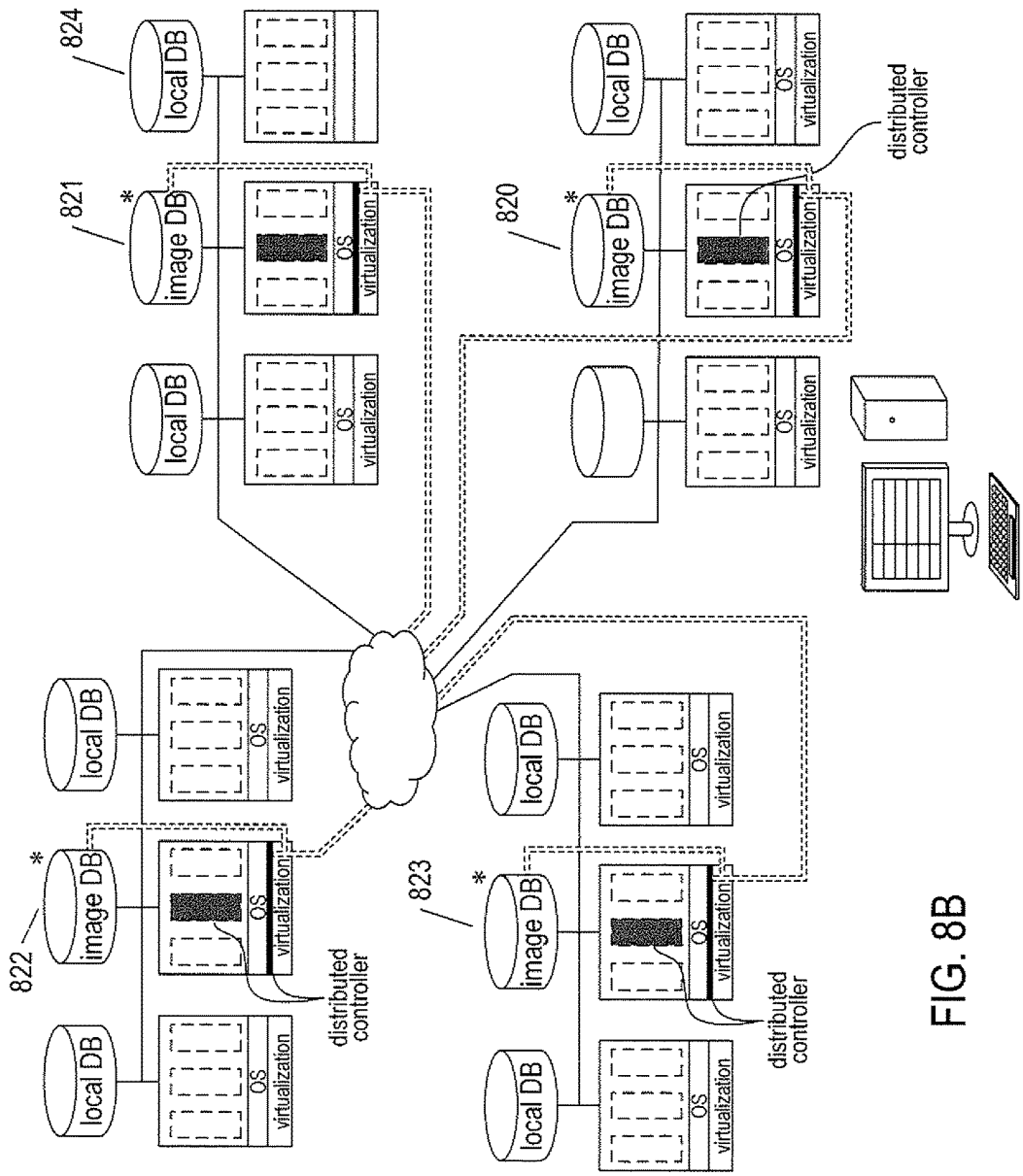
Figure 8C:
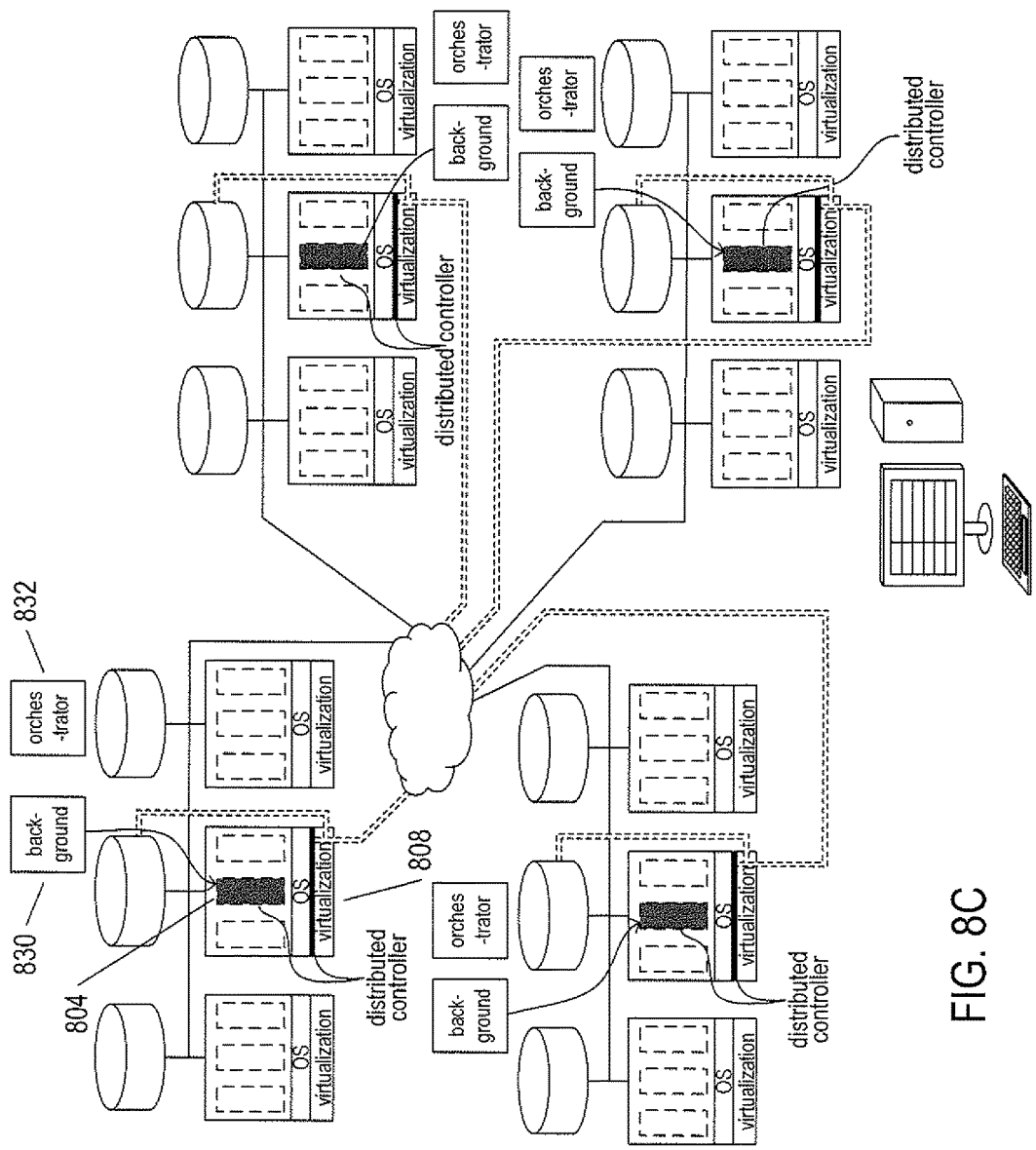

FIGS. 8A-C illustrate features and characteristics of one implementation of the efficient VM-distribution subsystem within a distributed computing system to which the current document is directed. As noted above, FIGS. 8A-C use many of the same illustration conventions that are used in FIGS. 7A-D. The first characteristic of the currently disclosed VM-image-distribution subsystem is that the VM-distribution subsystem is distributed across the IAAS platform. As shown in FIG. 8A, this distributed VM-image-distribution subsystem, referred to as a "distributed controller," executes as a distributed component of the distributed computing system 802-805 and is implemented by multiple VMs instantiated in multiple different management servers 806-809. Each distributed controller, such as distributed controller 803, includes both logic within an executing VM 810 as well as a support component 812 within the virtualization layer with the management server. This support component allows for messaging and data transmission between distributed-controller instances through a management network, represented in FIG. 8A by dashed-line channels, such as dashed-line channel 814, that does not require passing of messages and data back and forth through operating system and higher layers of network stacks, but that is instead efficiently implemented by the hypervisor-support 812 for the distributed controllers and hypervisor communications subsystems. Use of the management network provides significant computational advantages, including lower computational overhead and lower data-transmission latencies.

FIG. 8B shows another feature of one implementation of the currently disclosed VM-image-distribution subsystem. The various data-storage devices within the distributed computing system that store VM images are designated either as image data stores 820-823 or as local data stores for storing VM images, such as local data store 824. Of course, any given physical data-storage appliance or device may serve both as an image data store and a local data store. However, in general, the image data stores are usually discrete data-storage device, appliances, or systems distributed among clusters or geographically distinct groups of servers as a type of distributed, but locally centralized, VM-image data-store, while the local data stores are more widely distributed for efficient access by servers on which VMs are instantiated. By decentralizing VM-image storage, the risk of catastrophic failure is decreased, data-storage capacity constraints may be relaxed, and latencies associated with VM-image transport to servers for instantiation as executing VMs are generally more predictable and significantly smaller than for a centralized image database. Data-storage flexibility is vastly increased, allowing data-storage overheads to be spread out over the entire distributed computer system and shifted to place VM images in proximity to servers that access them.

Finally, as shown in FIG. 8C, the distributed-controller instances each include a background subsystem and an orchestrator subsystem, such as the background subsystem 830 and orchestrator subsystem 832 contained within the distributed controller 804 of the management server 808. The background subsystem 830 is responsible for transferring VM images among local data stores in a cluster or group of servers associated with a local instance of the distributed controller as well as transferring VM images between the image data store of a cluster or group and remote image data stores associated with remote distributed-controller instances. The orchestrator subsystem 832 is responsible for managing VM-image distribution within the distributed computing system in order to prevent internal-network overload, to prevent inefficient consumption of data-storage resources, and to provide for rapid VM instantiation.

Figure 8D:
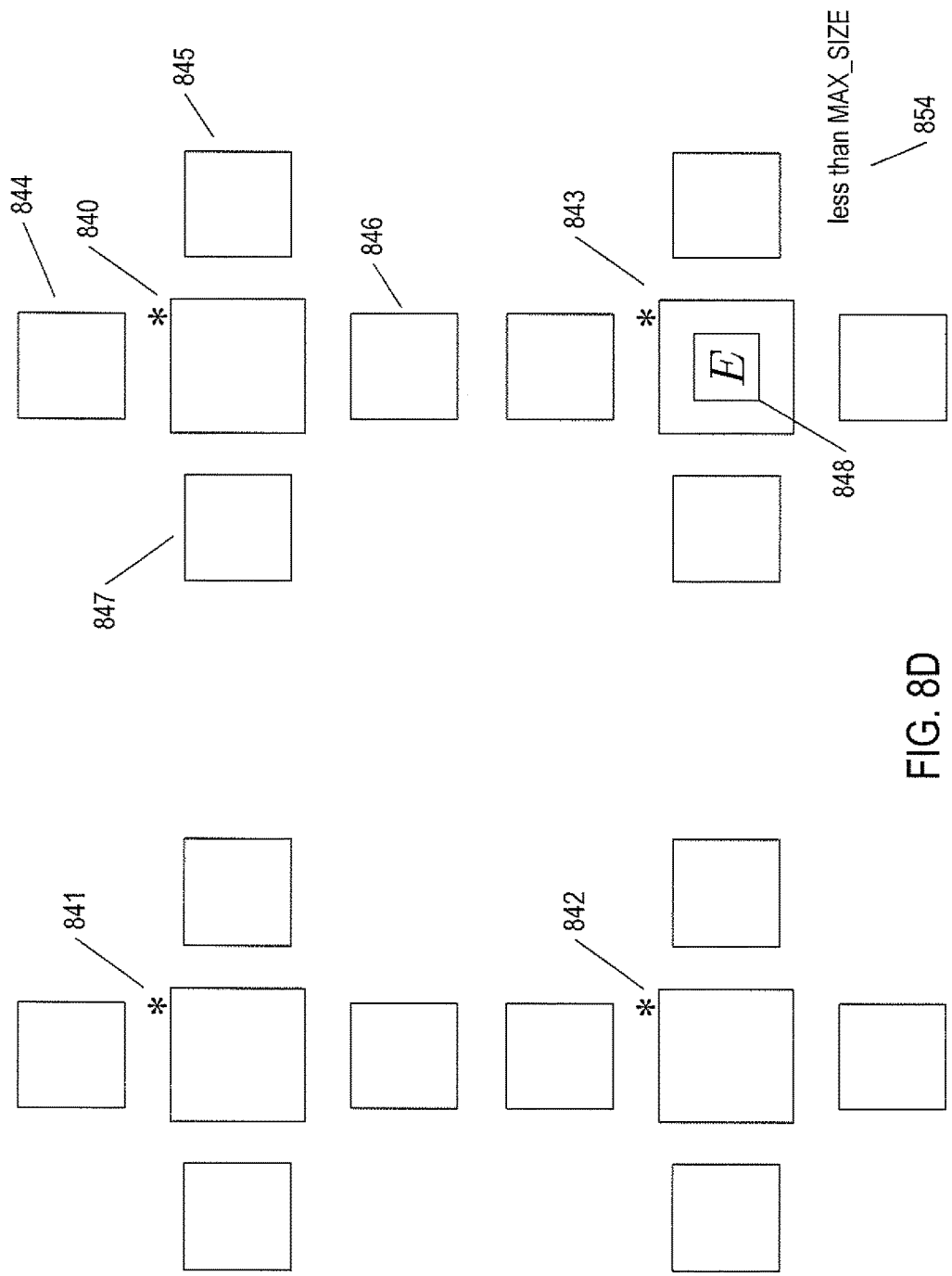
Figure 8F:
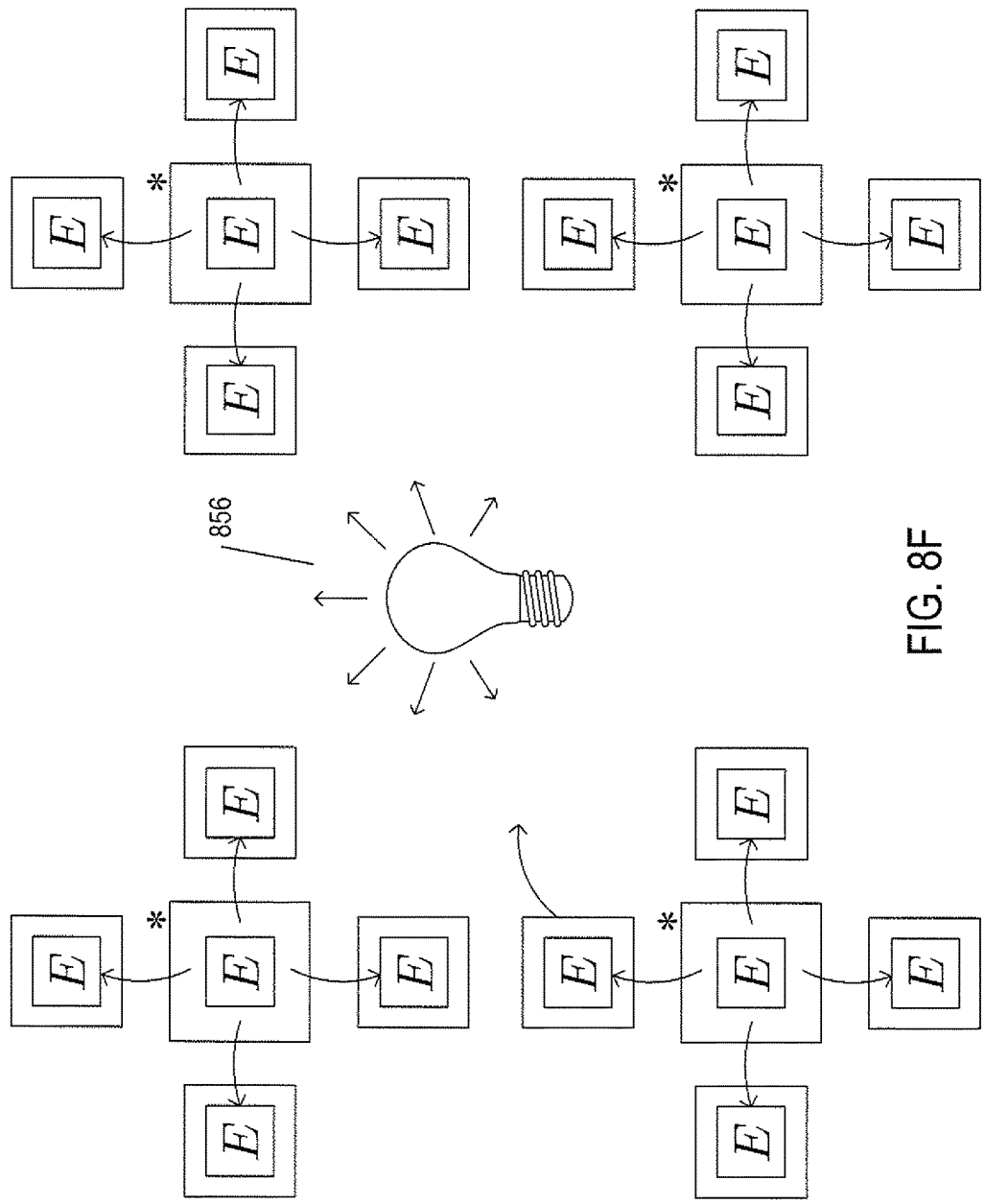
Figure 8G:
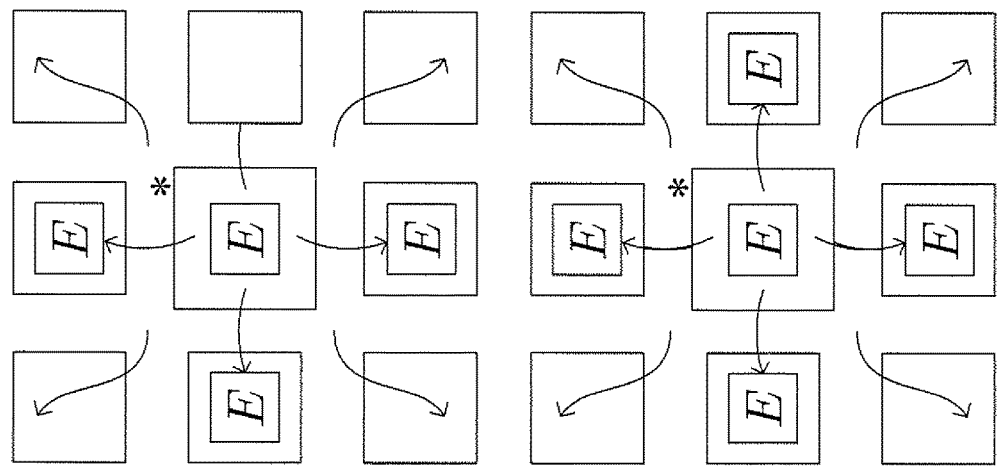
Figure 8G:
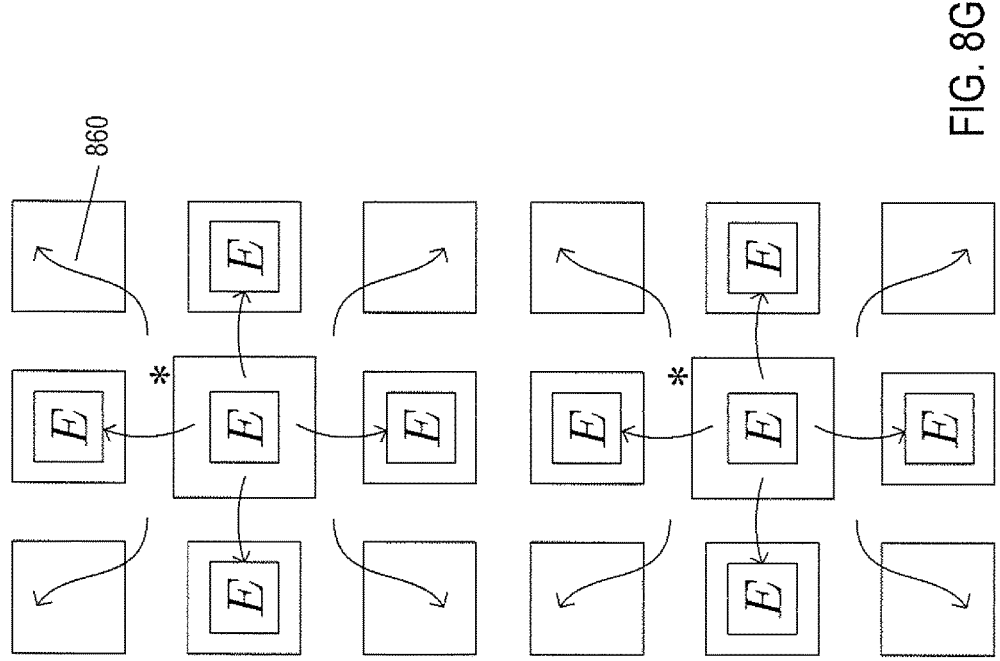

The currently disclosed VM-image distribution subsystem classifies VM images as belonging to at least two different types. FIGS. 8D-G illustrate a first type of VM image, referred to as an EAGER image. In FIGS. 8D-G, and in FIGS. 9A-D that follow, the distributed computer system shown in FIGS. 8A-C is further abstracted to a set of data stores. The data stores include four image data stores 840-843 and a set of local data stores associated with each image data store, such as local data stores 844-847 associated with image data store 840. These clusters, each generally comprising an image data store and multiple local data stores, are additionally associated with a local instance of the distributed controller that implements the distributed VM-image distribution subsystem with a distributed computer system. When an EAGER VM image 848 is created and stored within a first image data store, as shown in FIG. 8D, the distributed VM-distribution subsystem propagates the EAGER image, as shown in FIG. 8E, to each of the other image data stores, the propagation represented by curved arrows 850-852 in FIG. 8E. Note that EAGER images are required to have a size less than a maximum size, as noted 854 in FIG. 8D. This size constraint helps control data-storage overhead for VM images. Then, as shown in FIG. 8F, the EAGER image is propagated, within each server group, from the image data store to a first set of associated local data stores. Once these initial copies to associated local data stores have completed, the distributed controller issues a signal 856, in a distributed fashion, to the IAAS-platform management system to allow the IAAS-platform management system to designate the VM image as having been successfully created and initially distributed, and therefore available for instantiation on any server within the distributed computing system. Finally, as shown in FIG. 8G, the EAGER image continues to propagate outward to additional local data stores within each server group or cluster, as represented in FIG. 8G by curved arrows, such as curved arrow 860, emanating outward from the image data store within each group or cluster. The propagation of the EAGER image to local data stores is carried out by the orchestrator and background subsystems.

Figure 9A:
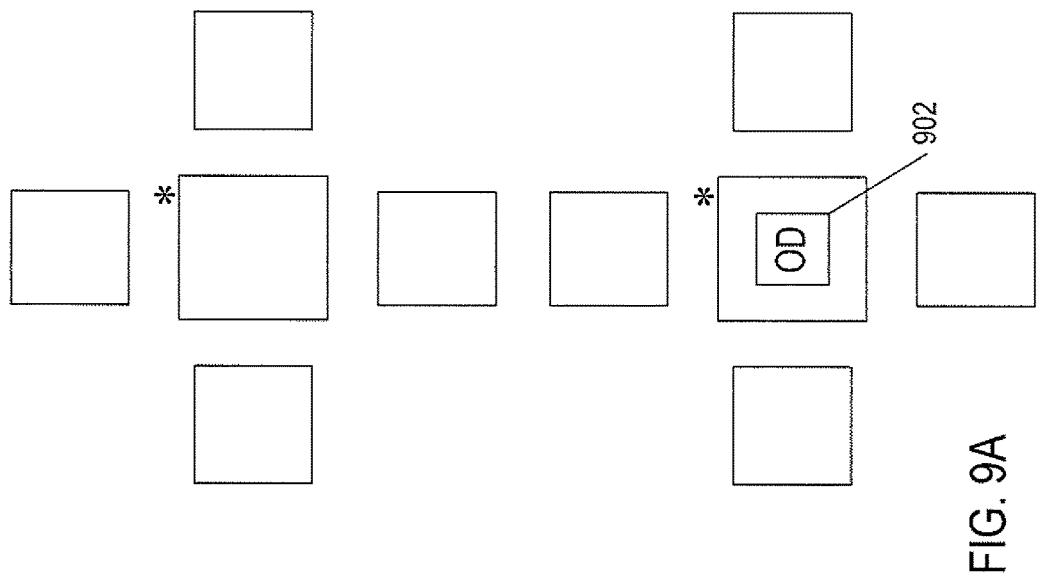
FIGS. 9A-D illustrate a second type of VM image referred to as an ON_DEMAND image.
Figure 9A:
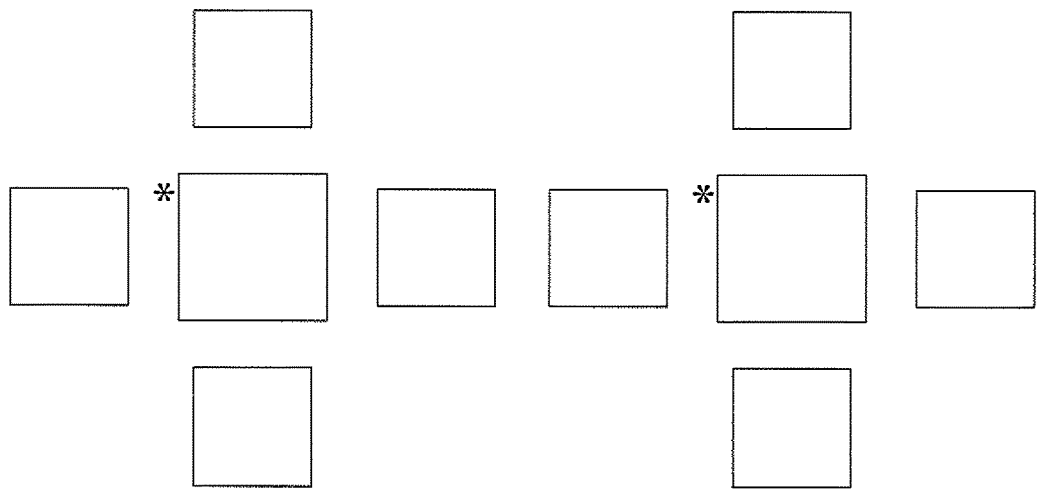
Figure 9B:
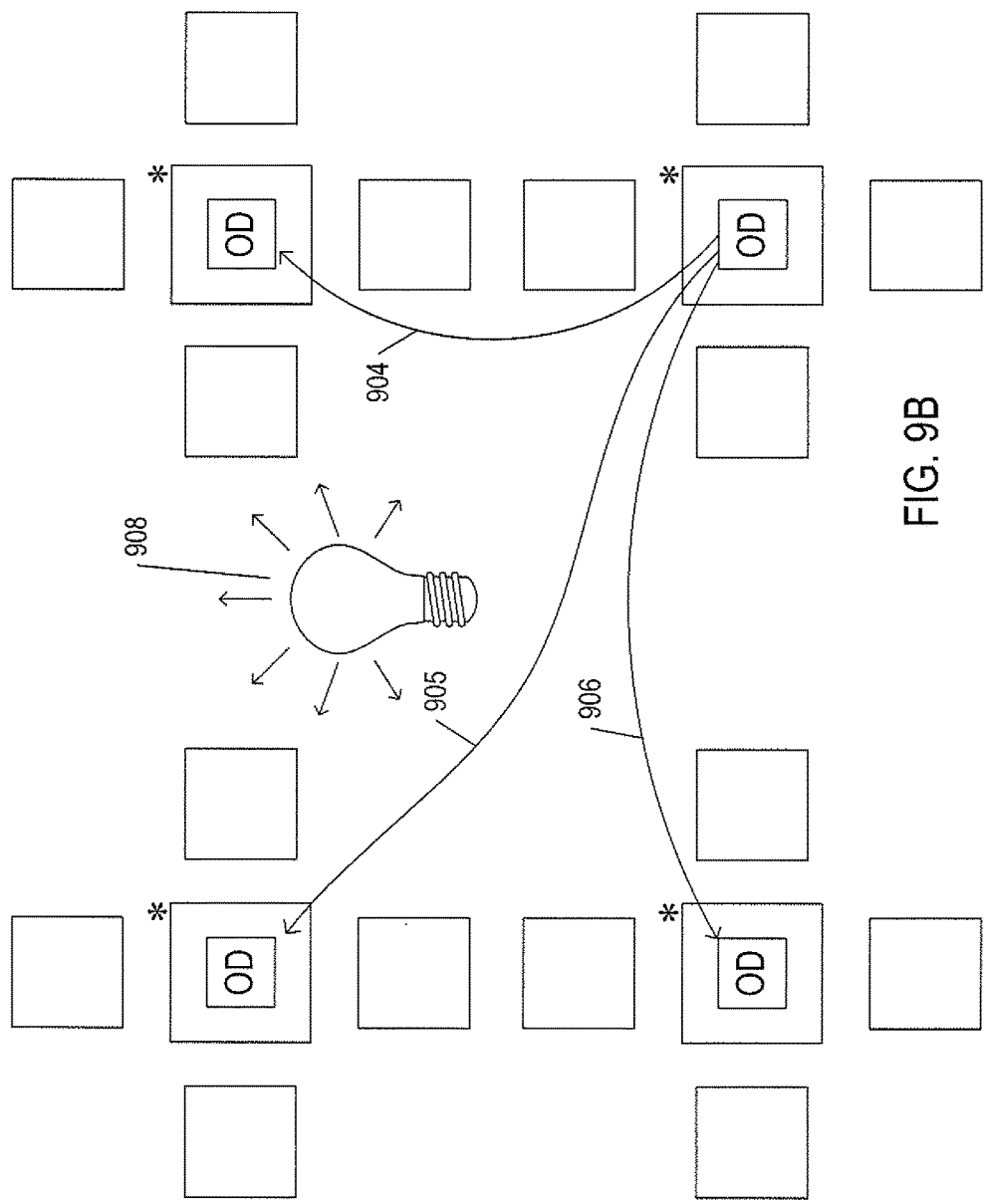
Figure 9C:
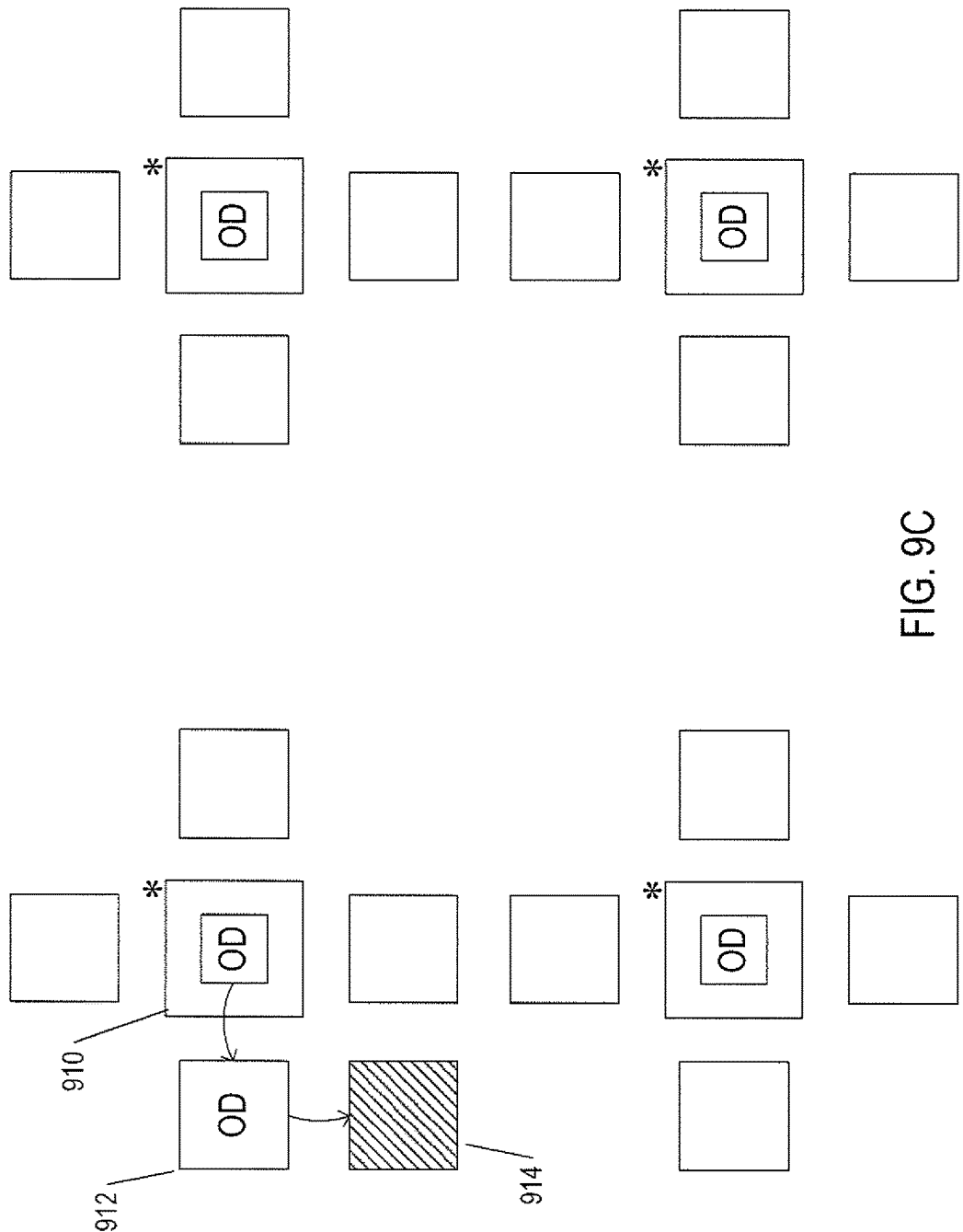
Figure 9D:
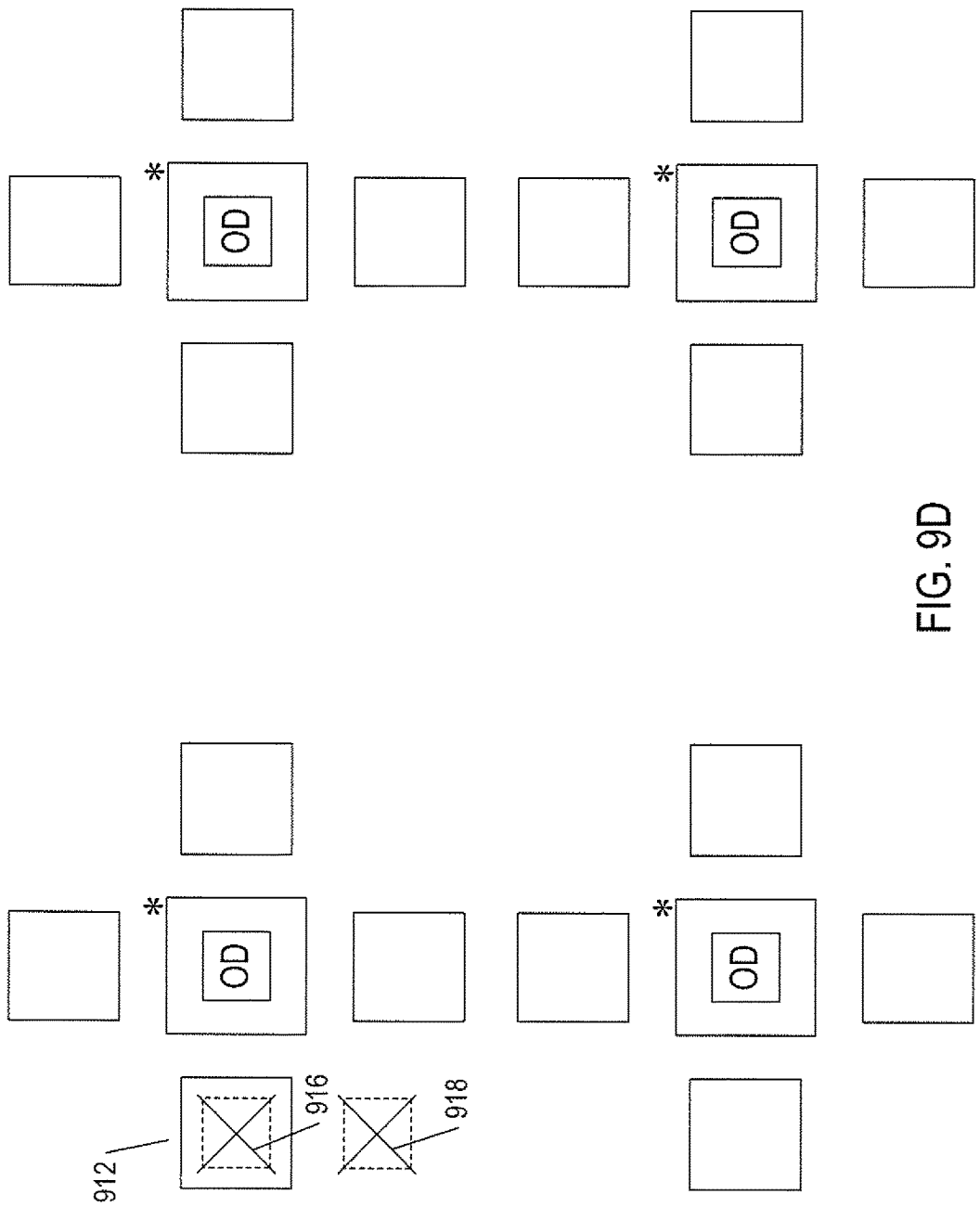

FIGS. 9A-D illustrate a second type of VM image referred to as an ON_DEMAND image. FIGS. 9A-D use the same illustration conventions as used in FIGS. 8D-G. When an ON_DEMAND VM image is created 902, as shown in FIG. 9A, then, like an EAGER image, as shown in FIG. 9B, the ON_DEMAND VM image is propagated 904-906 to the other image data stores within the distributed computing system. However, unlike the EAGER image, once this initial propagation is completed, a distributed signal 908 is issued by the distributed VM-distribution subsystem to indicate that the creation of the ON_DEMAND VM image is successfully completed. The ON_DEMAND VM image is not further propagated outward from the image data stores to local data stores at this point, unlike the EAGER image. Instead, as shown in FIG. 9C, an ON_DEMAND VM image is transferred from an image data store 910 to an associated local data store 912 when a request is received by the IAAS-platform management system to instantiate the VM 914 in a server. Furthermore, as shown in FIG. 9D, the copy of the ON_DEMAND VM image does not persist in the local data store 912, but is removed from the local data store, as indicated by the cross 916 in FIG. 9D, when execution of the VM is terminated, as indicated by cross 918 in FIG. 9D.

The classification of VM images as being EAGER or ON_DEMAND can be fixed, at the time of creation, based on indications received through the management-system interface, or can be initially specified but then modified by the management system based on VM-image instantiation patterns and behaviors. For example, the management system may determine that an ON_DEMAND image is being frequently instantiated across the distributed computer system, and therefore promote the VM-image to EAGER status. Similarly, an EAGER image that is infrequently instantiated or instantiated only in one or a few server groups may be demoted to ON_DEMAND status.

The background and orchestrator subsystems within the distributed VM-distribution subsystem carefully cooperate to carry out distribution according to the two different distribution modes corresponding to the two different types of VM images, EAGER and ON_DEMAND, as discussed above with reference to FIGS. 8D-G and FIGS. 9A-D, in a way that minimizes the impact on the overall network bandwidth within the distributed computing system. This cooperation is next described with reference to example data structures and control-flow diagrams.

FIGS. 10A-M illustrate one implementation of the orchestrator subsystem within a local distributed VM-image distribution subsystem within a management system that manages an IAAS platform comprising a distributed computer system. In this implementation, the orchestrator subsystem is responsible for implementing most of the functionality discussed above with reference to FIGS. 7A-9D, while the background subsystem is responsible for initiating batch copies of VM images through the management network. FIGS. 10A-10M provide illustration of the data structures and provide control-flow diagrams that illustrate certain of the functionalities of the background and orchestrator subsystems within the distributed VM-distributed subsystem to which the current document is directed. It should be noted that there are many ways to distribute VM-distribution functionality. The logic can be combined into a single subsystem, rather than using two different orchestrator and background subsystems, and partitioning of VM-distribution logic between the orchestrator and background subsystems may differ in different implementations. The implementation discussed with reference to FIGS. 10A-10M is only one example of distributed-controller-logic implementation.

Figure 10A:
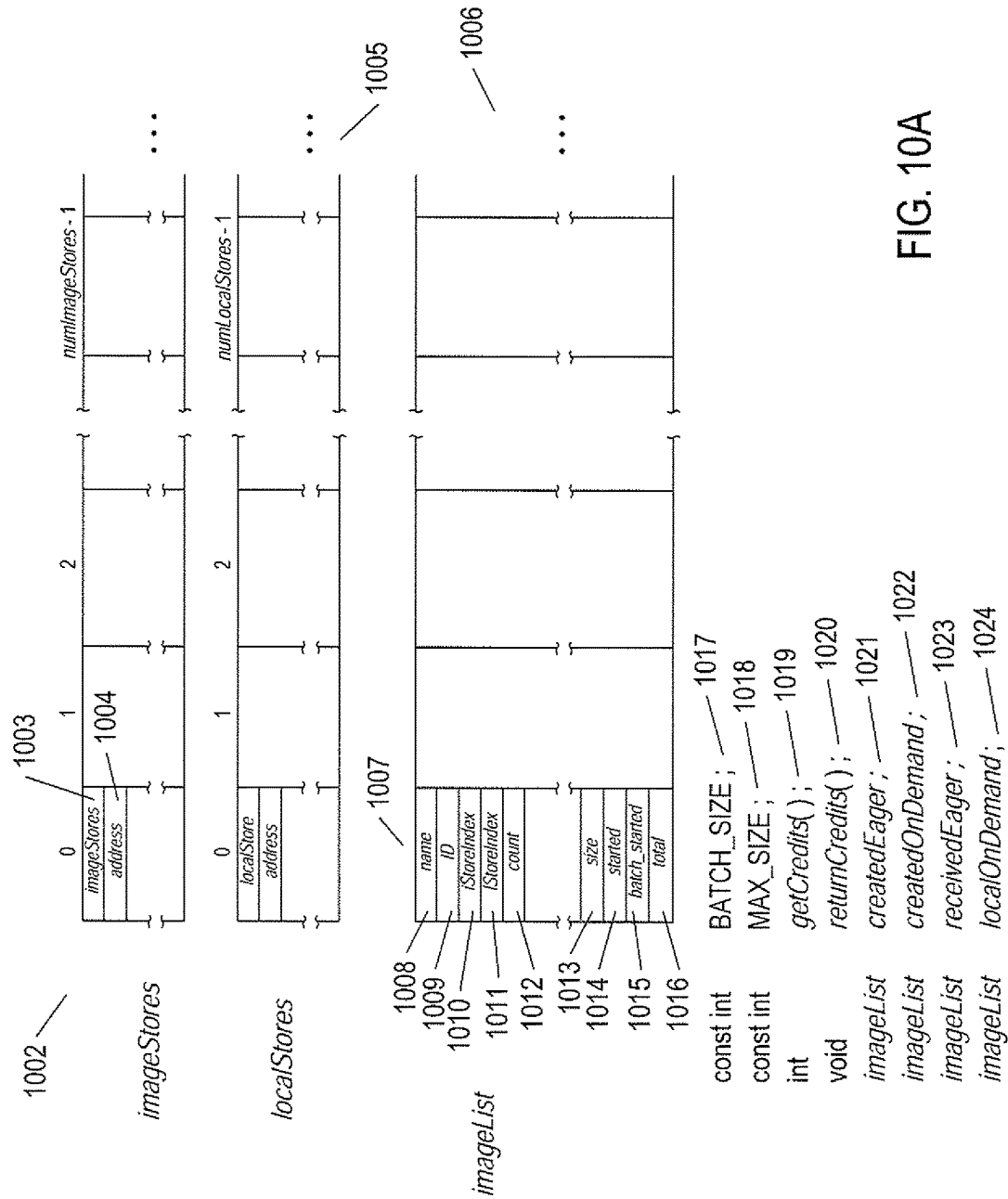
FIGS. 10A-M illustrate one implementation of the orchestrator subsystem within a local distributed VM-image distribution subsystem within a management system that manages an IAAS platform comprising a distributed computer system.

FIG. 10A illustrates certain data structures maintained within a local distributed controller that are used by the orchestrator subsystem of the local distributed controller in the logic illustrated by the control-flow diagrams that follow. A first data structure 1002, imageStores, is a list or array of entries, each describing a remote image data store associated with remote instances of distributed controllers. There are numImageStores entries in the imageStores array or list. Each entry includes identifying information for the imageStore 1003 as well as a network address 1004 for the imageStore. Many other types of information may be stored in entries of the imageStores list. A similar list or array 1005, localStores, stores entries representing local data stores associated with the local instance of the distributed controller. An imageList 1006 is also an array or list, each entry of which represents a VM image that needs to be copied by the local instance of the distributed controller. Each entry of an imageList data structure, such as entry 1007, includes the fields: (1) name 1008, the name of the VM image; (2) ID, 2009, a unique identifier for the VM image; (3) iStoreIndex 1010, an index into the imageStores list; (4) lStoreIndex 1011, an index into the localStores list 1011; (5) count 1012, the number of copy completion messages received for the current batch of copy operations carried out on the VM image represented by the entry; (6) size 1013, the number of copy operations included in the the current batch of copy operations for the VM image; (7) started 1014, a Boolean indication of whether or not copying has begun for the VM image; (8) batch_started 1015, a Boolean value indicating whether or not the current batch of copies has begun; and (9) total 1016, the total number of copies that have been carried out for the VM image. The data structures imageStore and localStore, and the data structure type imageList can be implemented as linked lists, arrays, or other types of data structures that, along with member functions, support list-like operations, including append and delete functions and functions that allow entries to be accessed by index or by traversal operations. In general, entries are ordered in the lists by time of entry, with the least recently added entries appended to the ends of the lists.

The constant BATCH_SIZE 1017 is the default size for a next batch of copies to be carried out with respect to a VM image. The constant MAX_SIZE 1018 is the maximum size, in bytes, for an EAGER VM image. The function getCredits ( ) 1019 is a distributed controller function that returns a number of copy credits for use by the orchestrator subsystem of a local distributed-controller instance. The routine returnCredits( ) 1020 is used by a local instance of the distributed controller to return unused copy credits.

Four image lists are maintained: (1) createdEager 1021, a list of VM images that have been locally created and that need to be copied to the remote image stores, as discussed above with reference to FIG. 8E; (2) createdOnDemand 1022, a list of ON_DEMAND VM images that have been locally created and that need to be copied to the remote image stores, as discussed above with reference to FIG. 9B; (3) receivedEager 1023, a list of EAGER VM images that have been transferred to the local distributed-controller instance and that need to be copied to local data stores associated with the local distributed-controller instance, as discussed above with reference to FIGS. 8F-G; and (4) localOnDemand 1024, a list of ON_DEMAND VM images that have been requested to be copied from the local image store to a local store associated with the local instance of the distributed controller, as discussed above with reference to FIGS. 9C-D.

Figure 10B:
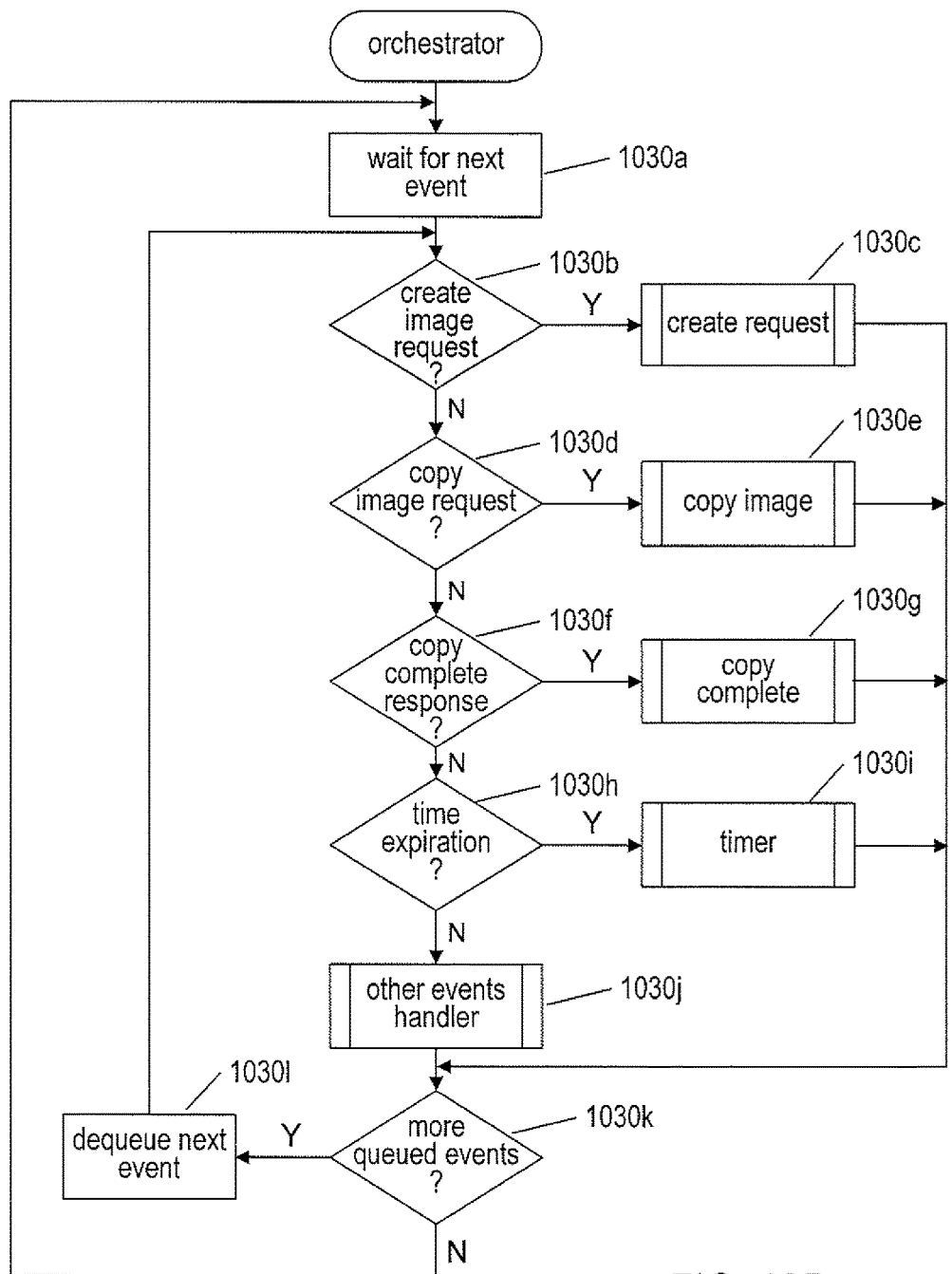

FIG. 10B illustrates, in control-flow-diagram form, an event loop that underlies the orchestrator subsystem in the disclosed implementation. In step 1030a, the orchestrator waits for a next event to occur. Note that, in the control-flow diagrams, variables such as the variable c that contains a count of available copy credits is assumed to be passed by reference to called routines that modify the count, while values passed to routines that are not modified are assumed to be called by value. When the next event is a create-image-request event, as determined in step 1030b, the handler "create request" is called in step 1030c. A create-image-request event is generated when the local instance of the management system has created a new VM image and stored the newly created VM image in the local image data store. The management system generates the create-image-request event to initiate copying of the VM image to remote image data stores by the distributed controller. When the next event is a copy-image-request event, as determined in step 1030d, the handler "copy image" is called in step 1030e. A copy-image-request event is generated when the local distributed-controller instance receives a newly created. VM image that has been transferred to the local image data store by a remote instance of the distributed controller or when a request has been made to the management system to instantiate a VM, in a local server, from an ON_DEMAND image in the local image data store. When the next event is a copy-complete-response event, as determined in step 1030f, the handler "copy complete" is called in step 1030g. A copy-complete-response event is a message returned by the background subsystem, which initiates copy requests on behalf of the orchestrator, indicating that a VM-image copy has completed. When the next-occurring event is a timer-expiration event, as determined in step 1030h, the handler "timer" is called in step 1030i. A timer-expiration event represents expiration of a copy timer maintained by the orchestrator to periodically execute VM-image-copy logic of the orchestrator to copy VM images, as needed. Other types of events are handled by a default handler in step 1030j. When, after handling an event, there are more events that have been queued in the interim, as determined in step 1030k, a next event is dequeued, in step 1030l, and control flows back to step 1030b. Otherwise, control flows back to step 1030a, where the orchestrator waits for a next event to occur.

Figure 10C:
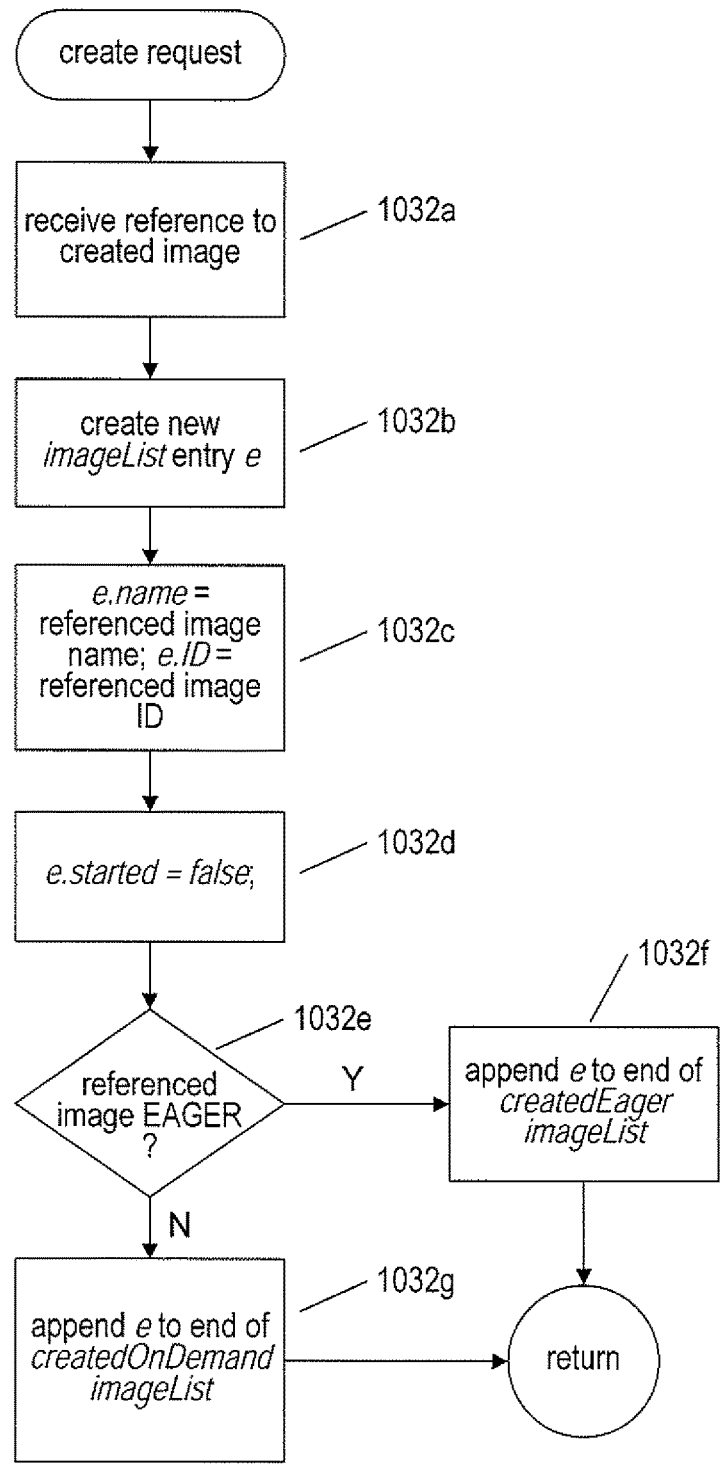

FIG. 10C provides a control-flow diagram for the handler "create request," called in step 1030c of FIG. 10B. In step 1032a, a reference to a created image is received. In step 1032b, a new imageList entry e is created to represent the new image. The name and ID fields of the new entry e are initialized, in step 1032c, and the field e.started is set to false in step 1032d. By setting the field e.started to false, copying of the image will ensue generally during handling of the next timer expiration, when there are sufficient copy credits available. When the referenced VM image is an EAGER image, as determined in step 1032; the newly created entry e is appended to the end of the createdEager imageList, in step 1032f. Otherwise, the new entry is appended to the createdOnDemand imageList in step 1032g.

Figure 10D:
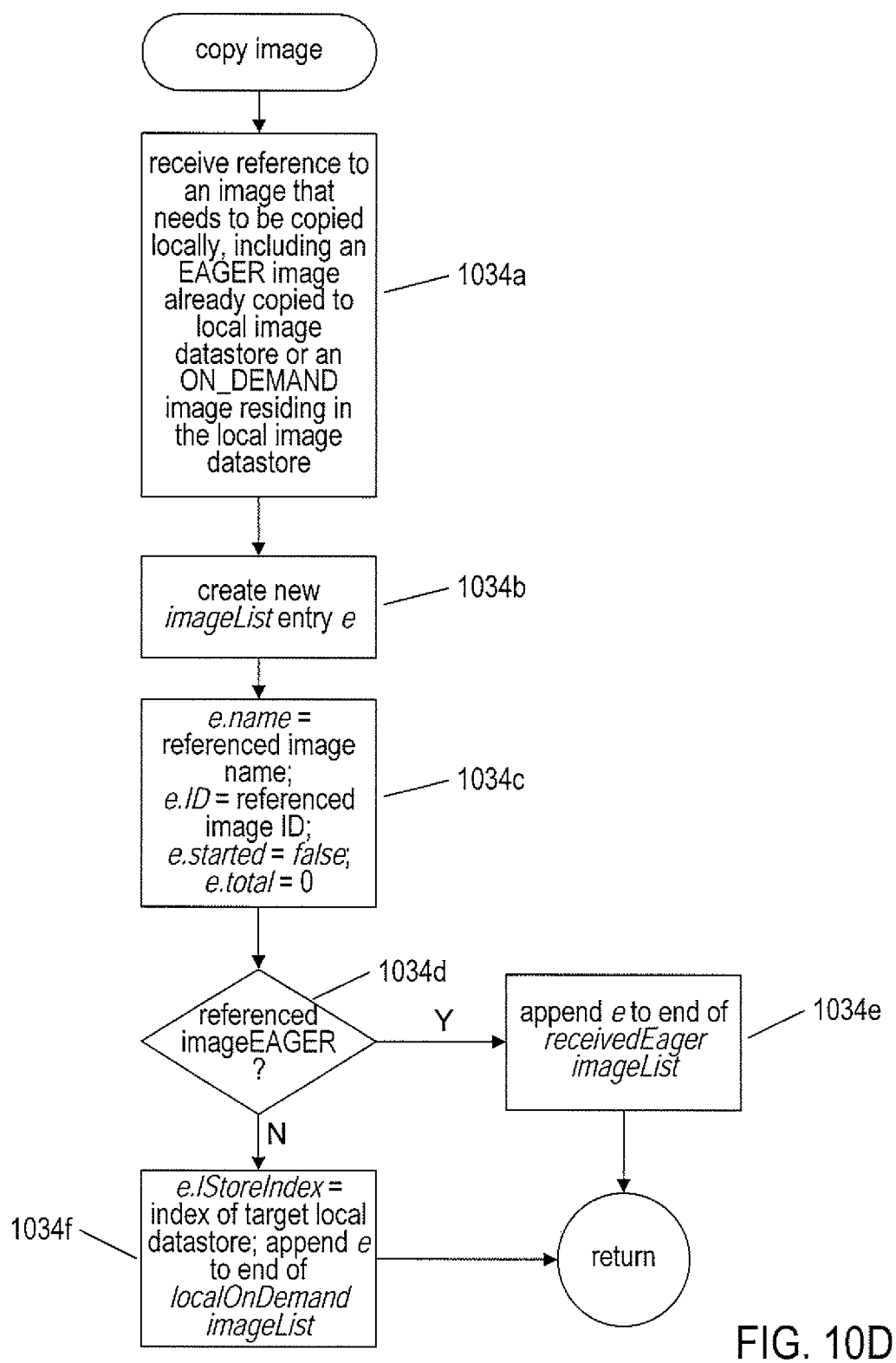

FIG. 10D provides a control-flow diagram for the handler "copy image," called in step 1030e of FIG. 10B. In step 1034a, a reference to a VM image that needs to be copied locally is received. This may be an EAGER VM image that has been copied to the local image database by a remote instance of the distributed controller or an ON_DEMAND VM image that resides in the local image data store and that has been requested to be instantiated on a local server. In step 1034b, a new imageList entry e is created for the VM image referenced by the received reference. The values of various fields in new entry are initialized in step 1034c. When the received VM image is EAGER, as determined in step 1034d, the new entry is appended to the receivedEager imageList, in step 1034e. Otherwise, the new entry is appended to the localOnDemand imageList, in step 1034f, after initializing the field e.lStoreIndex to the index of the target local data store in the localStores list.

Thus, the "create request" and "copy image" handlers create, initialize, and place entries into an appropriate imageList data structure for different types of VM images that need to be copied. Once these entries are in place, copying of the VM images occurs during handling of the timer expirations. The actual copies are carried out in a batch-processing mode by the background subsystem, as discussed below.

Figure 10E:
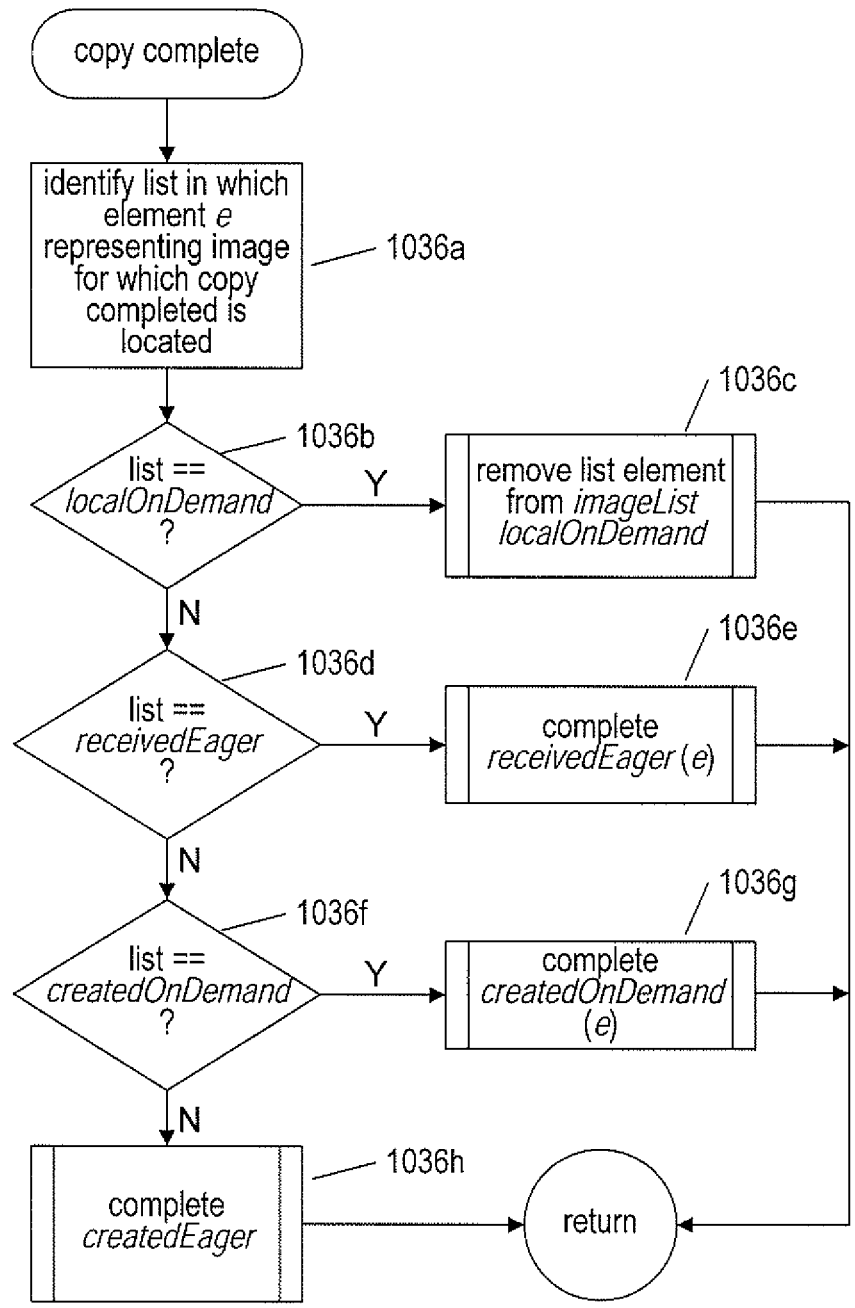

FIG. 10E provides a control-flow diagram for the handler "copy complete," called in step 1030g of FIG. 10B. In step 1036a, the list on which an element e that represents the VM image for which a copy-completion message has been received from the background subsystem is identified. The copy-completion message includes information provided to the background subsystem when a copy job was submitted to the background subsystem, such as the VM-image identifier, an indication of the imageList data structure that contains the element e representing the VM image, and/or other such information. When the identified list is the localOnDemand image list, as determined in step 1036b, the element e is removed from localOnDemand in step 1036c. Only a single copy of the VM image, stored in the local image data store, is carried out for VM images represented by elements on the localOnDemand image list. When the identified list is the receivedEager list, as determined in step 1036d, the handler "complete receivedEager" is called, in step 1036e. When the identified list is the createdOnDemand list, as determined in step 1036f, the routine "complete createdOnDemand" is called, in step 1036g. Otherwise, the copy completion is for a VM image represented by an element in the createdEager image list, in which case the routine "complete createdEager" is called, in step 1036h.

Figure 10F:
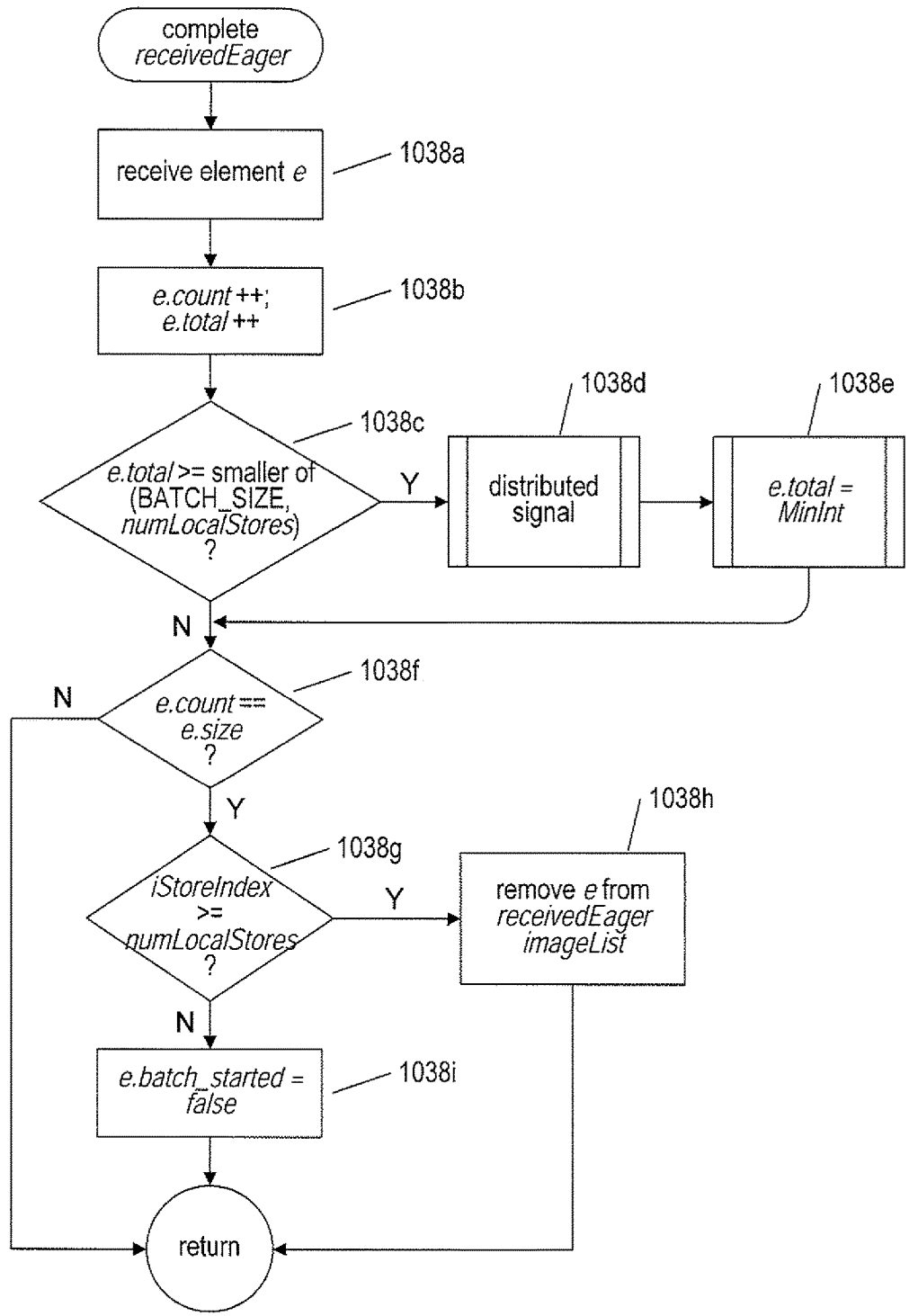

FIG. 10F provides a control-flow diagram for the routine "complete receivedEager," called in step 1036e of FIG. 10E. In step 1038a, the element e that represents the VM image for which a copy was completed is received. In step 1038b, the fields e.count and e.total are incremented. When the current value in e.total is greater than or equal to the smaller of the constant BATCH_SIZE or the number of local data stores in the localStores list, as determined in step 1038c, a call to the routine "distributed signal" is made, in step 1038d, to inform the distributed controller that the first batch of copies to local data stores have been completed for an EAGER VM image. The distributed controller monitors these signals and, when the local distributed controllers finish their first batch of copies to local data stores, a creation-completion signal is generated, as discussed above with reference to FIG. 8F. In step 1038e, the field e.total is set to a very large negative value to prevent any more calls to the routine "distributed signal." When the field e.count is equal to e.size, as determined in step 1038f, the current batch of copies has been completed. When all copies of the VM image have been completed, as determined in step 1038g, the list element e is removed from the receivedEager image list, in step 1038h. Otherwise, in step 1038i, the field e.batch_started is set to false in order to initiate a next batch of copies during timer-expiration handling.

Figure 10G:
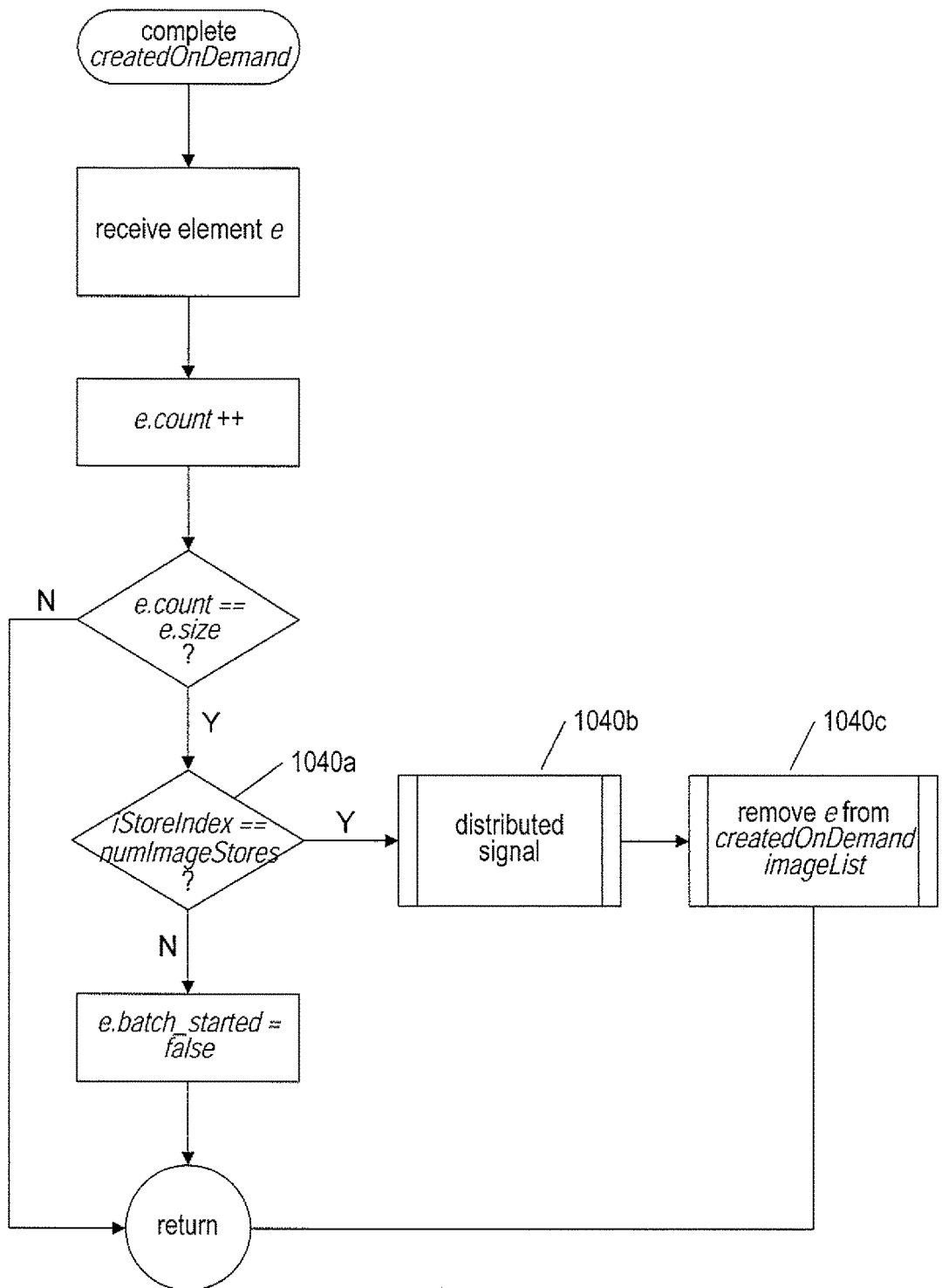

FIG. 10G provides a control-flow diagram for the routine "complete createdOnDemand," called in step 1036g in FIG. 10E. The steps in this control-flow diagram are similar to those in FIG. 10F and FIG. 10H, discussed below. In the case of VM images, representations of which are stored in the image list createdOnDemand, when all copies to remote image data stores are completed, as determined in step 1040a, the routine "distributed signal" is called, in step 1040b, to inform the distributed controller that a creation signal can be generated for the VM image, as discussed above with reference to FIG. 9B. Then, in step 1040c, the list element e is removed from the createdOnDemand image list.

Figure 10H:
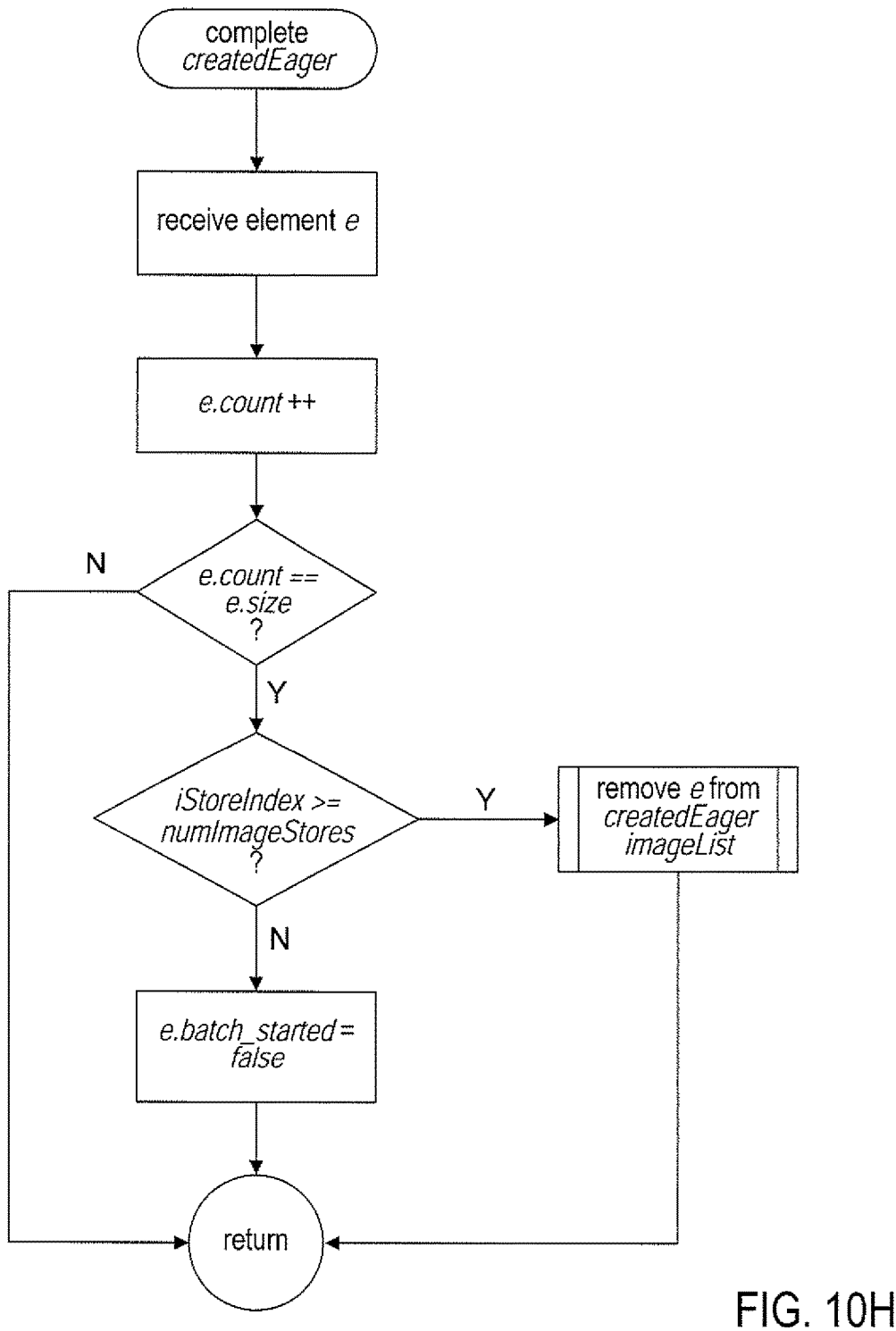

FIG. 10H provides a control-flow diagram for the routine "complete createdEager," called in step 1036c of FIG. 10E. The steps in this figure are similar to those of FIGS. 10F-G, and are therefore not again discussed.

Figure 10I:
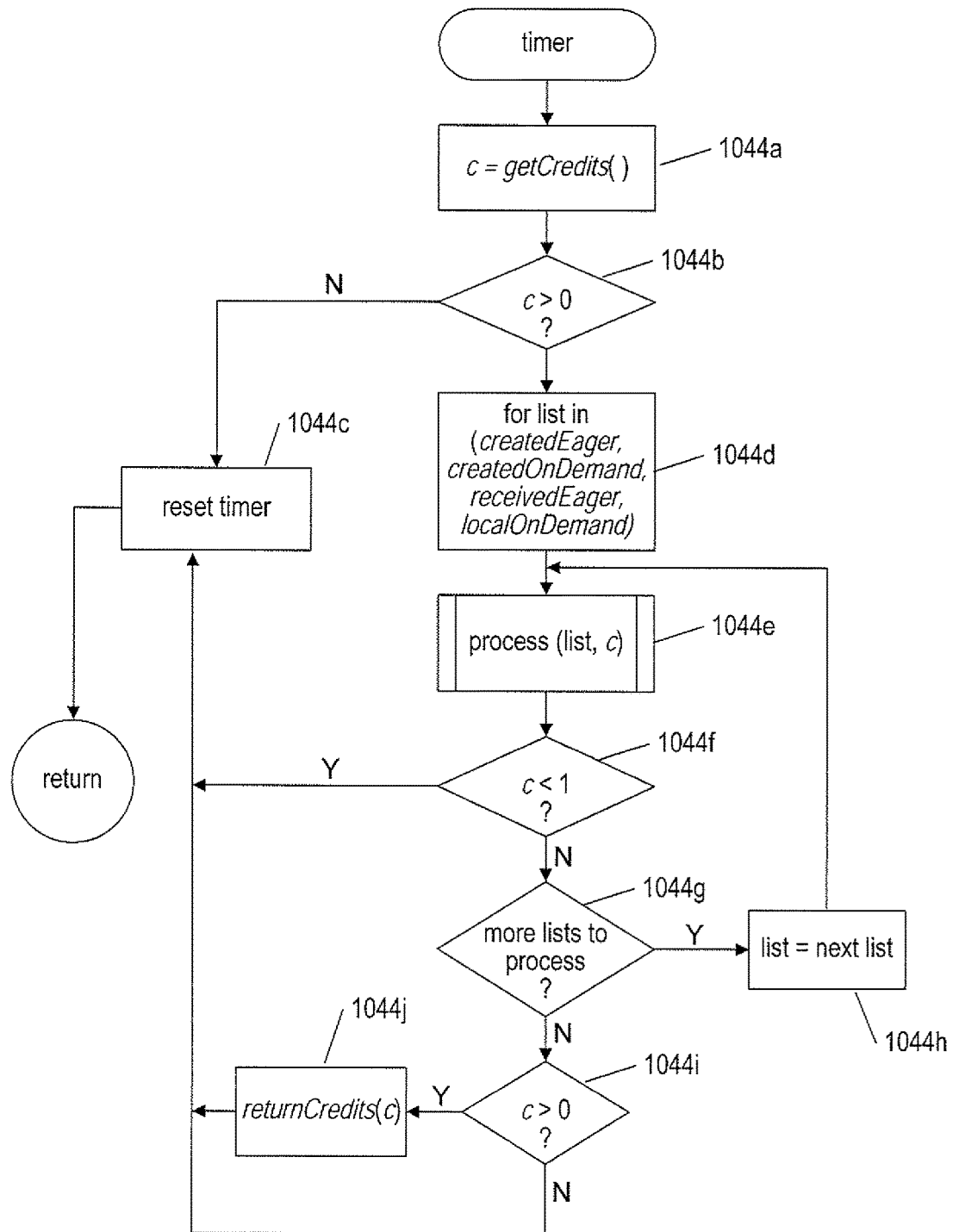

FIG. 10I provides a control-flow diagram for the handler "timer," called in step 1030i of FIG. 10B. In step 1044a, the distributed function getCredits is called to obtain a number of copy credits in the local variable c. When the number of credits obtained from the distributed controller is less than 1, as determined in step 1044b, the timer is reset, in step 1044c, and the handler returns. When copy credits are obtained, then, in the for-loop of steps 1044d-1044h, each image list is considered, in priority order, by a call to the routine "process" in step 1044e. Whenever the copy credits are exhausted, as determined in step 1044f, the for-loop terminates and control flows to step 1044c. When, following termination of the for-loop, there are copy credits remaining, as determined in step 1044i, the copy credits are returned to the distributed controller in step 1044j prior to control flowing to step 1044c.

Figure 10J:
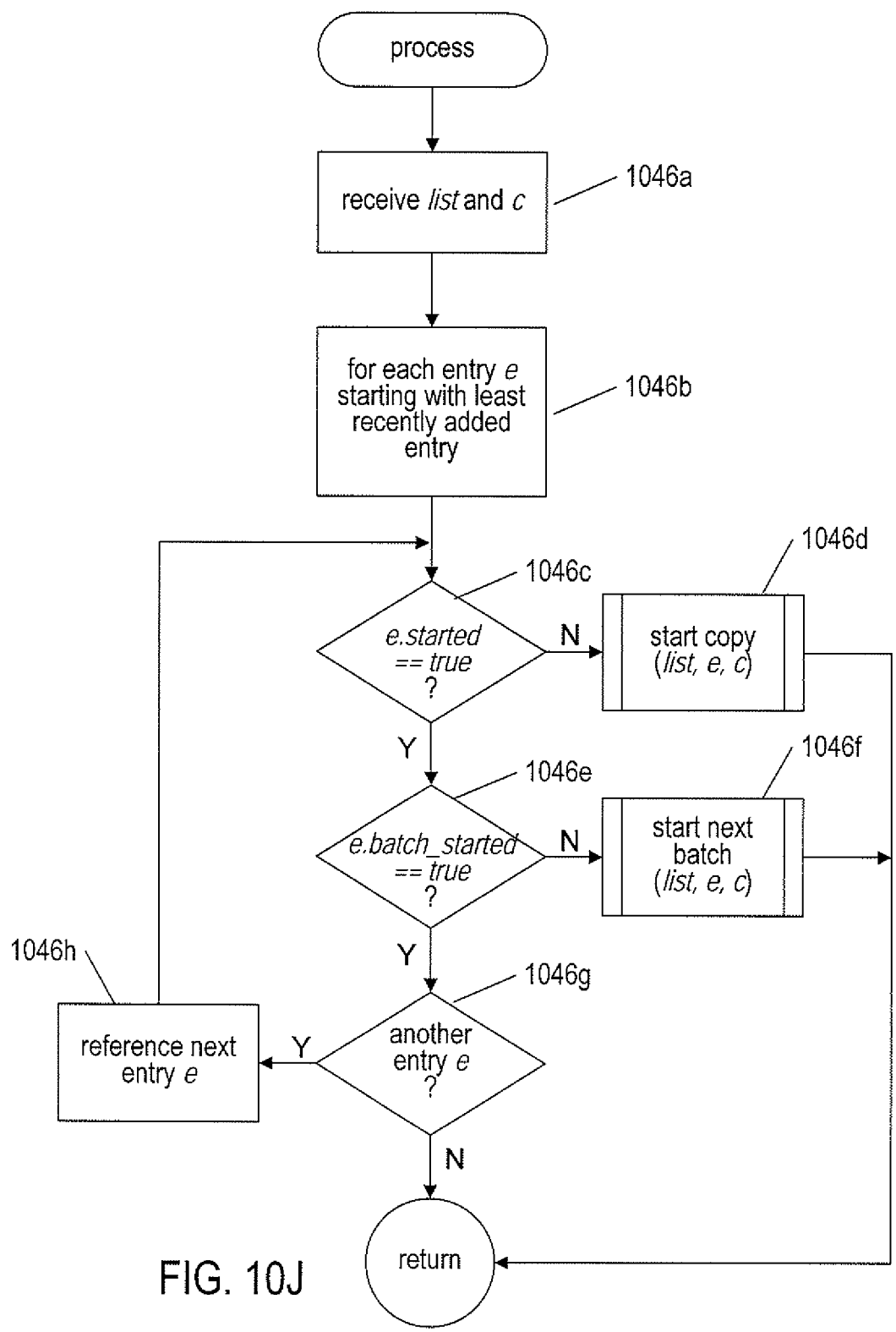

FIG. 10J is a control-flow diagram that illustrates the routine "process," called in step 1044e of FIG. 10I. In step 1046a, the routine "process" receives a list to process and the number of available copy credits c. In the for-loop of steps 1046b-1046h, each element in the list is considered. When the field e.started in an element is not true, the routine "start copy" is called, in step 1046d, to initiate copying of the VM image represented by the element. Otherwise, when the field e.batch_started is not true, as determined in step 1046e, the routine "start next batch" is called, in step 1046f, to start a next batch copies for the VM image.

Figure 10K:
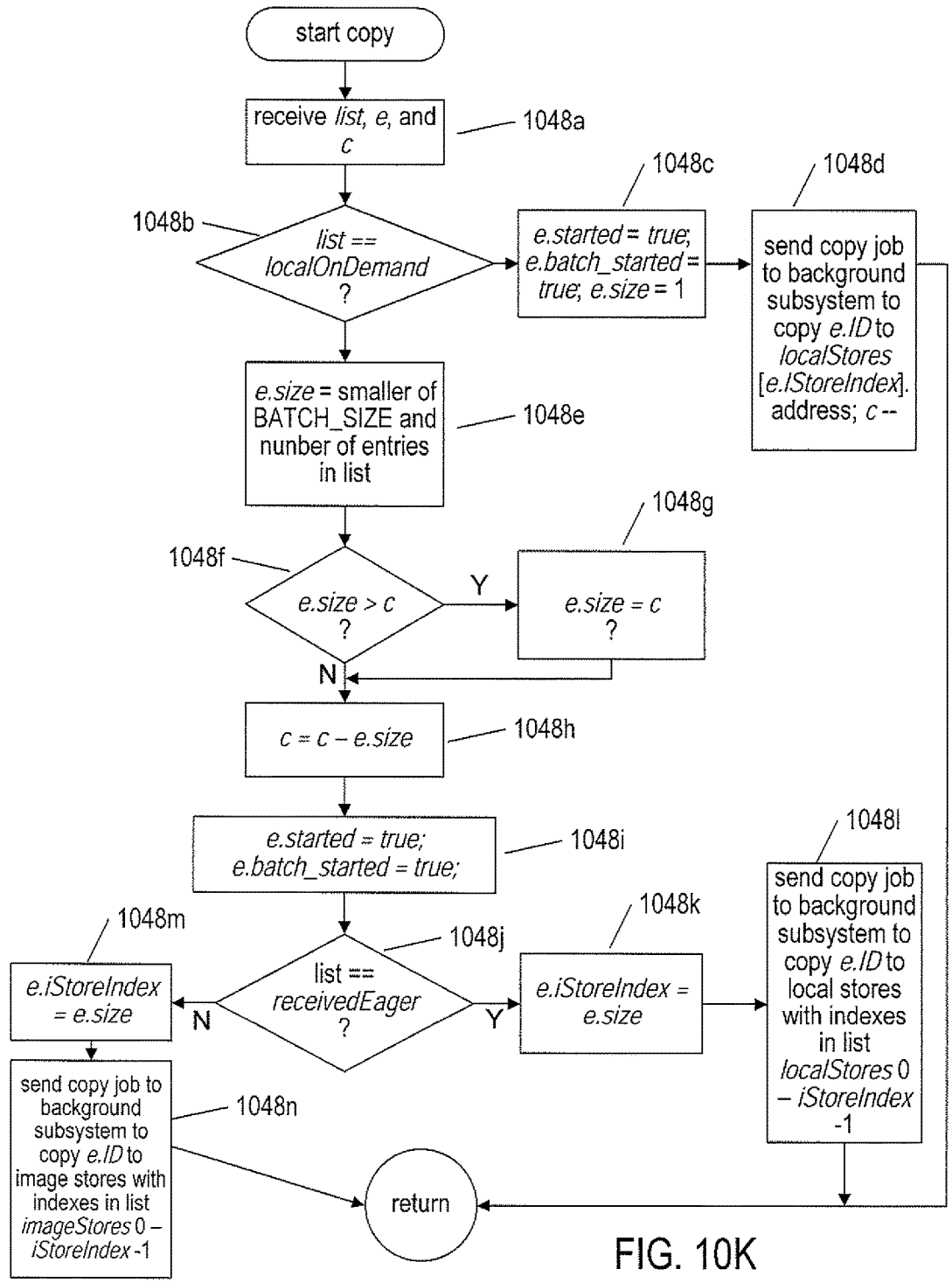

FIG. 10K provides a control-flow diagram for the routine "start copy," called in step 1046d of FIG. 10J. In step 1048a, a list, list element, and number of copy credits c are received. When the list is the localOnDemand image list, as determined in step 1048b, the currently considered element e is updated, in step 1048c, and a copy job is sent to the background subsystem to copy the VM image to a local data store in step 1048d. The number of copy credits is accordingly decremented, in step 1048d. Otherwise, in steps 1048e-1048g, a next batch size for copying the VM image is determined as the smallest value of the constant BATCH_SIZE, the number of entries remaining in the list, and the number of copy credits available. In step 1048h, the number of copy credits is decremented by the determined batch size and, in step 1048i, the element e representing the currently considered VM image is updated to reflect initiation of a next batch of copies. When the received list is the receivedEagerList, as determined in step 1048j, the e.lStoreIndex field of the element e is updated, in step 1048k, to point to the next local data store for a next batch copy and, in step 1048l, a copy job for the current batch is sent to the background subsystem to copy the VM image to a next set of local data stores. When the list is either the createdEager image list or the createdOnDemand image list, as determined in step 1048j, then, in step 1048m, the field e.istoreindex of the element e is updated and a copy job for copying the VM image to remote image data stores is sent to the background subsystem in step 1048n.

Figure 10L:
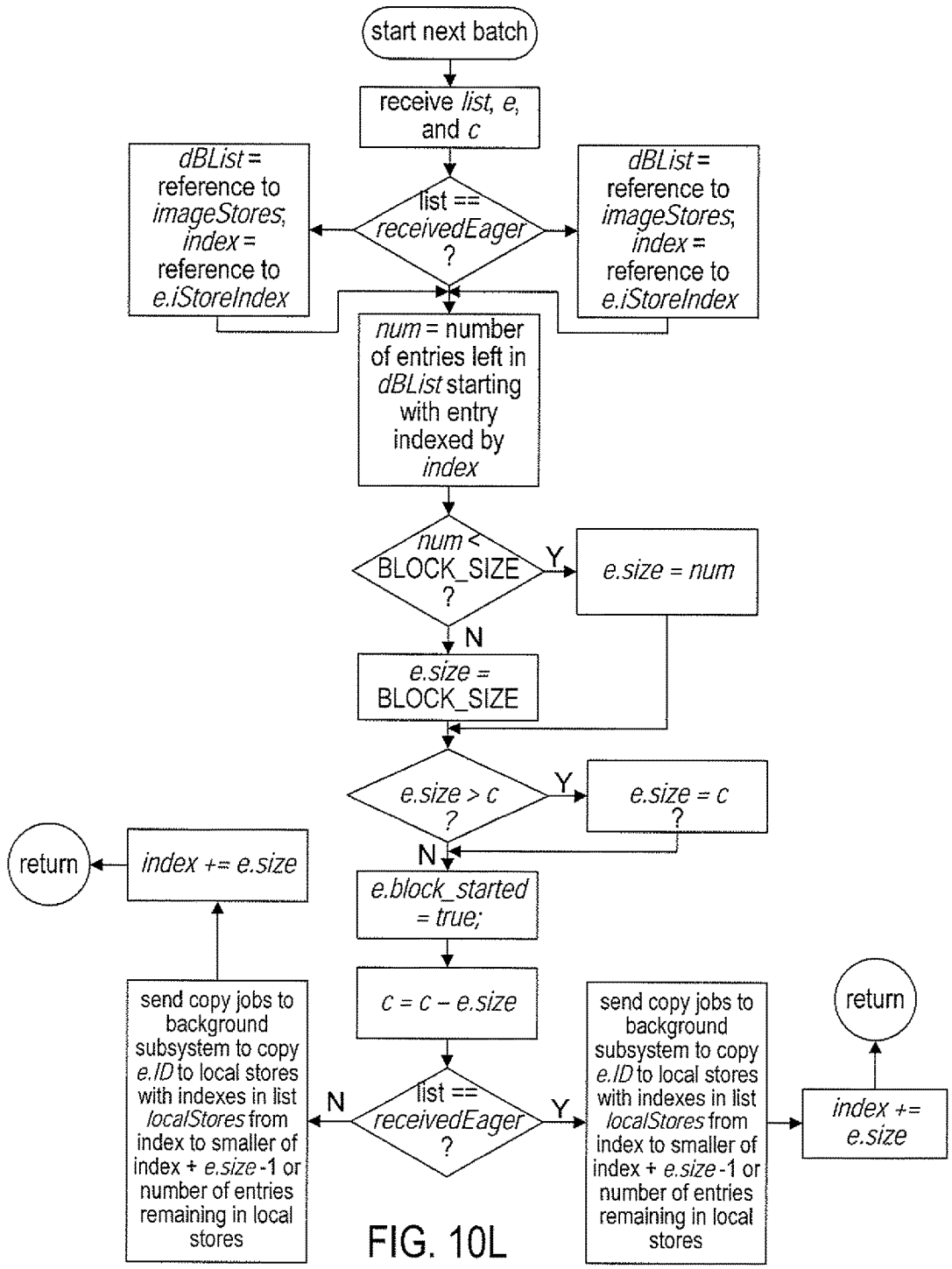

FIG. 10L provides a control-flow diagram for the routine "start next batch," called in step 1046f of FIG. 10J. This routine is similar to the routine "start copy," provided in FIG. 10K, with the element e for a VM image updated to reflect initiation of an next batch of copies and the copy job issued to the background subsystem.

Figure 10M:
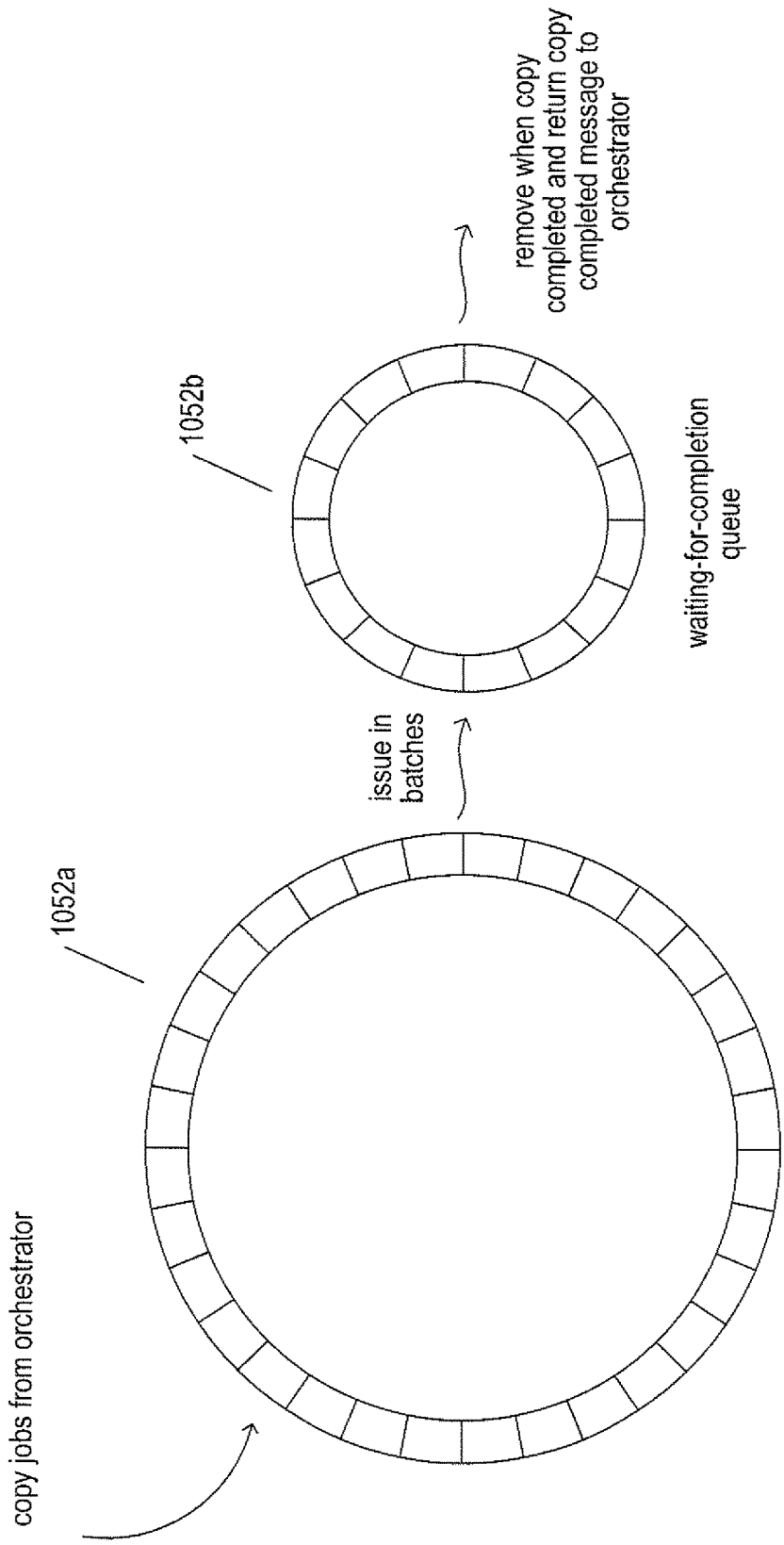

FIG. 10M illustrates operation of the background subsystem. The background subsystem maintains two job queues, an input queue 1050a, 1052a, and a waiting-for-completion queue 1052b. When the background subsystem receives copy jobs from the orchestrator, each copy operation is entered, as a separate entry, into the input queue. In a concurrently executing process, the background subsystem continuously removes batches of copy operations from the input queue, initiates the copies with a distributed controller, and places the copy-operation information into the waiting-for-completion queue. As copy operations complete, entries are removed from the waiting-for-completion queue and copy-completion messages are returned to the orchestrator. When the waiting-for-completion queue is empty, another batch of copy operations are removed from the input queue and initiated.

The background subsystem may employ different batch sizes than the batch sizes employed by the orchestrator. The orchestrator handles monitoring of the various different types of copy operations, generating creation-completion signals, and other aspects of VM-image distribution carried out by the distributed controller. The background subsystem is concerned with carrying out copy operations forwarded to and by the orchestrator subsystem in a batch mode that is designed to prevent deleterious impacts to networks within the distributed computer system that implements the IAAS platform Although the present invention has been described in terms of particular embodiments, it is not intended that the invention be limited to these embodiments. Modifications within the spirit of the invention will be apparent to those skilled in the art. For example, any of many different implementations of the distributed controller can be obtained by varying any of many different implementation and design parameters, including choice of hardware layer, virtualization layer, operating system, programming language, modular organization, data structures, control structures, and other such design and implementation parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A distributed VM-image-distribution subsystem of a management system within a distributed computer system having multiple servers, multiple data-storage devices, and one or more internal networks, the distributed VM-image-distribution subsystem implemented as stored computer instructions that, when executed on one or more processors of one or more computer systems, control the computer system to:
   organize data stores within the distributed computer system that store VM images into groups, each group including an image data store and multiple associated local data stores;
   classify each VM image as one of an EAGER image and an ON_DEMAND image;
   when an EAGER image is created and stored in a first image data store, propagate the VM image to the remaining image data stores within the distributed computer system and propagate the VM image from each image data store to the local data stores associated with the image data store;
   when an ON_DEMAND image is created and stored in a first image data store, propagate the VM image to the remaining image data stores within the distributed computer system; and
   when the management system processes a request to instantiate an ON_DEMAND image on a server, transfers the ON_DEMAND image from an image data store to a local data store accessible to the server.

2. The distributed VM-image-distribution subsystem of claim 1 further comprising:
   local distributed-VM-image-distribution instances, each executing within a management server and each associated with an image data store and multiple associated local data stores.

3. The distributed VM-image-distribution subsystem of claim 2 wherein each local distributed-VM-image-distribution instance includes a background subsystem responsible for initiating batches of VM-image copy operations through a management network and an orchestrator subsystem that manages VM-image propagation through the distributed computer system.

4. The distributed VM-image-distribution subsystem of claim 2 wherein, when an ON_DEMAND image is created and stored in a first image data store and when the ON_DEMAND image has been propagated to the remaining image data stores within the distributed computer system, the distributed VM-image-distribution subsystem generates a signal to the management system, following reception of which the management system indicates successful completion of creation of the ON_DEMAND image and availability of the ON_DEMAND image for instantiation.

5. The distributed VM-image-distribution subsystem of claim 2 wherein, when, following creation of an EAGER image and storing of the EAGER image in a first image data store, the EAGER image is successfully propagated to the remaining image data stores within the distributed computer system and propagated to a first batch of local data stores associated with each image data store, the distributed VM-image-distribution subsystem generates a signal to the management system, following reception of which the management system indicates successful completion of creation of the EAGER image and availability of the EAGER image for instantiation.

6. The distributed VM-image-distribution subsystem of claim 2 wherein EAGER images are restricted to sizes below a threshold size.

7. The distributed VM-image-distribution subsystem of claim 2 wherein sizes of ON_DEMAND images are not restricted.

8. The distributed VM-image-distribution subsystem of claim 2 wherein the EAGER and ON_DEMAND classifications of VM images are one of:
   fixed when VM images are created; and
   initially assigned when VM images are created and later modified, by the management system, when the instantiation pattern of a VM image is incompatible with the classification assigned to the VM image.

9. A method carried out in a distributed VM-image-distribution subsystem of a management system within a distributed computer system having multiple servers, multiple data-storage devices, and one or more internal networks, the method comprising:
   organizing data stores within the distributed computer system that store VM images into groups, each group including an image data store and multiple associated local data stores;
   classifying each VM image as one of an EAGER image and an ON_DEMAND image;
   when an EAGER image is created and stored in a first image data store, propagating the VM image to the remaining image data stores within the distributed computer system and propagating the VM image from each image data store to the local data stores associated with the image data store;

when an ON_DEMAND image is created and stored in a first image data store, propagating the VM image to the remaining image data stores within the distributed computer system; and when the management system processes a request to instantiate an ON_DEMAND image on a server, transferring the ON_DEMAND image from an image data store to a local data store accessible to the server.

10. The method of claim 9 wherein the distributed-VM-image-distribution subsystem comprises:

local distributed-VM-image-distribution instances, each executing within a management server and each associated with an image data store and multiple associated local data stores.

11. The method of claim 10 wherein each local distributed-VM-image-distribution instance includes a background subsystem responsible for initiating batches of VM-image copy operations through a management network and an orchestrator subsystem that manages VM-image propagation through the distributed computer system.

12. The method of claim 11 wherein, when an ON_DEMAND image is created and stored in a first image data store and when the ON_DEMAND image has been propagated to the remaining image data stores within the distributed computer system, generating a signal to the management system, following reception of which the management system indicates successful completion of creation of the ON_DEMAND image and availability of the ON_DEMAND image for instantiation.

13. The method of claim 10 wherein, when, following creation of an EAGER image and storing of the EAGER image in a first image data store, the EAGER image is successfully propagated to the remaining image data stores within the distributed computer system and propagated to a first batch of local data stores associated with each image data store, generating a signal to the management system, following reception of which the management system indicates successful completion of creation of the EAGER image and availability of the EAGER image for instantiation.

14. The method of claim 10 wherein EAGER images are restricted to sizes below a threshold size.

15. The method of claim 10 wherein sizes of ON_DEMAND images are not restricted.

16. The method of claim 10 wherein the EAGER and ON_DEMAND classifications of VM images are one of:
fixed when VM images are created; and
initially assigned when VM images are created and later modified, by the management system, when the instantiation pattern of a VM image is incompatible with the classification assigned to the VM image.

17. Computer instructions stored on a physical data-storage device that, when executed by one or more processors in a distributed computer system having multiple servers, multiple data-storage devices, and one or more internal networks, control a distributed VM-image-distribution subsystem of a management system within the distributed computer system to:

organize data stores within the distributed computer system that store VM images into groups, each group including an image data store and multiple associated local data stores;

classify each VM image as one of an EAGER image and an ON_DEMAND image;

when an EAGER image is created and stored in a first image data store, propagate the VM image to the remaining image data stores within the distributed computer system and propagate the VM image from each image data store to the local data stores associated with the image data store;

when an ON_DEMAND image is created and stored in a first image data store, propagate the VM image to the remaining image data stores within the distributed computer system; and when the management system processes a request to instantiate an ON_DEMAND image on a server, transfers the ON_DEMAND image from an image data store to a local data store accessible to the server.

18. The stored computer instructions of claim 17 wherein the distributed-VM-image-distribution subsystem comprises local distributed-VM-image-distribution instances, each executing within a management server and each associated with an image data store and multiple associated local data stores; and wherein each local distributed-VM-image-distribution instance includes a background subsystem responsible for initiating batches of VM-image copy operations through a management network and an orchestrator subsystem that manages VM-image propagation through the distributed computer system.

19. The stored computer instructions of claim 17 wherein, when an ON_DEMAND image is created and stored in a first image data store and when the ON_DEMAND image has been propagated to the remaining image data stores within the distributed computer system, generating a signal to the management system, following reception of which the management system indicates successful completion of creation of the ON_DEMAND image and availability of the ON_DEMAND image for instantiation.

20. The stored computer instructions of claim 17 wherein, when, following creation of an EAGER image and storing of the EAGER image in a first image data store, the EAGER image is successfully propagated to the remaining image data stores within the distributed computer system and propagated to a first batch of local data stores associated with each image data store, generating a signal to the management system, following reception of which the management system indicates successful completion of creation of the EAGER image and availability of the EAGER image for instantiation.

* * * * *